United States Patent [19]
Chiussi et al.

[11] Patent Number: 5,689,505
[45] Date of Patent: Nov. 18, 1997

[54] BUFFERING OF MULTICAST CELLS IN SWITCHING NETWORKS

[75] Inventors: Fabio Massimo Chiussi, Tinton Falls; Joseph George Kneuer, Fair Haven; Vijay Pochampalli Kumar, Freehold, all of N.J.

[73] Assignee: Lucent Technologies Inc., Murray Hill, N.J.

[21] Appl. No.: 584,932

[22] Filed: Jan. 16, 1996

[51] Int. Cl.$^6$ ................................................. H04L 12/56
[52] U.S. Cl. .......................... 370/388; 370/390; 370/417
[58] Field of Search .................... 370/54, 58.1, 58.2, 370/58.3, 60, 60.1, 61, 65.5, 94.1, 94.2, 230, 231, 232, 235, 252, 253, 355, 386, 388, 389, 390, 392, 395, 398, 412, 413, 414, 417, 418, 428, 429

[56] References Cited

U.S. PATENT DOCUMENTS

| | | | |
|---|---|---|---|
| 4,890,281 | 12/1989 | Balboni et al. | 370/60 |
| 5,237,565 | 8/1993 | Henrion et al. | 370/60.1 |
| 5,287,346 | 2/1994 | Bianchini, Jr. et al. | 370/60 |
| 5,528,592 | 6/1996 | Schibler et al. | 370/60.1 |
| 5,535,197 | 7/1996 | Cotton | 370/60 |

OTHER PUBLICATIONS

Design, Performance and Implementation of a Three-Stage Banyan-Based Architecture with Input and Output Buffers for Large Fast Packet Switches—Stanford University PHD Thesis; F. M. Chiussi; Jul., 1993.

Nonblocking Multi-Channel Switching in ATM Networks; H. Saidi, et al; IEEE, 1994.

Expandable ATOM Switch Architecture (XATOM) for ATM LANS; Fan, et al; IEEE, 1994.

*Primary Examiner*—Alpus H. Hsu
*Attorney, Agent, or Firm*—J. A. Caccuro

[57] ABSTRACT

Multicasting of an ingress cell received at one of a plurality of input ports is provided through a switch network to one or more of a plurality of output ports. The received ingress cell includes a data payload and a bitmap segment identifying the one or more output ports to which the data payload is to be outputted. The data payload is stored in an available cell buffer; associated with each cell buffer is a reference counter for storing a number equal to the number of ports to which that ingress cell is to be outputted. The bitmap segment is used to identify output ports to which the data payload is to be delivered, and a plurality of linked list queues in the memory, one for each of the output ports, is established. The bitmap segment is interpreted to identify output ports to which the data payload is to be delivered and an entry is made into the associated linked list output queue. The data payload is transmitted to each of the identified output ports, according to a sequence determined by the entries in the corresponding linked list queue.

20 Claims, 12 Drawing Sheets

FIG. 12

| SWITCH BACKPRESSURE BIT MAP | | | |
|---|---|---|---|
| PORT | 3k+0 | 3k+1 | 3k+2 |
| DLP | 0 1 2 3 | 0 1 2 3 | 0 1 2 3 |

FIG. 13  1301

| PORT BACKPRESSURE BIT MAP | | | | | | | | | |
|---|---|---|---|---|---|---|---|---|---|
| OUTPUT QUEUE | 0 | 1 | 2 | 3 | 4 | 5 | 6 | 7 | 8 |
| DELAY PRIORITY | 3 2 1 0 | 3 2 1 0 | 3 2 1 0 | 3 2 1 0 | 3 2 1 0 | 3 2 1 0 | 3 2 1 0 | 3 2 1 0 | 3 2 1 0 |
| ... | ... | ... | ... | ... | ... | ... | ... | ... | ... |
| OUTPUT QUEUE | 27 | 28 | 29 | 30 | 31 | 32 | 33 | 34 | 35 |
| DELAY PRIORITY | 3 2 1 0 | 3 2 1 0 | 3 2 1 0 | 3 2 1 0 | 3 2 1 0 | 3 2 1 0 | 3 2 1 0 | 3 2 1 0 | 3 2 1 0 |

1304

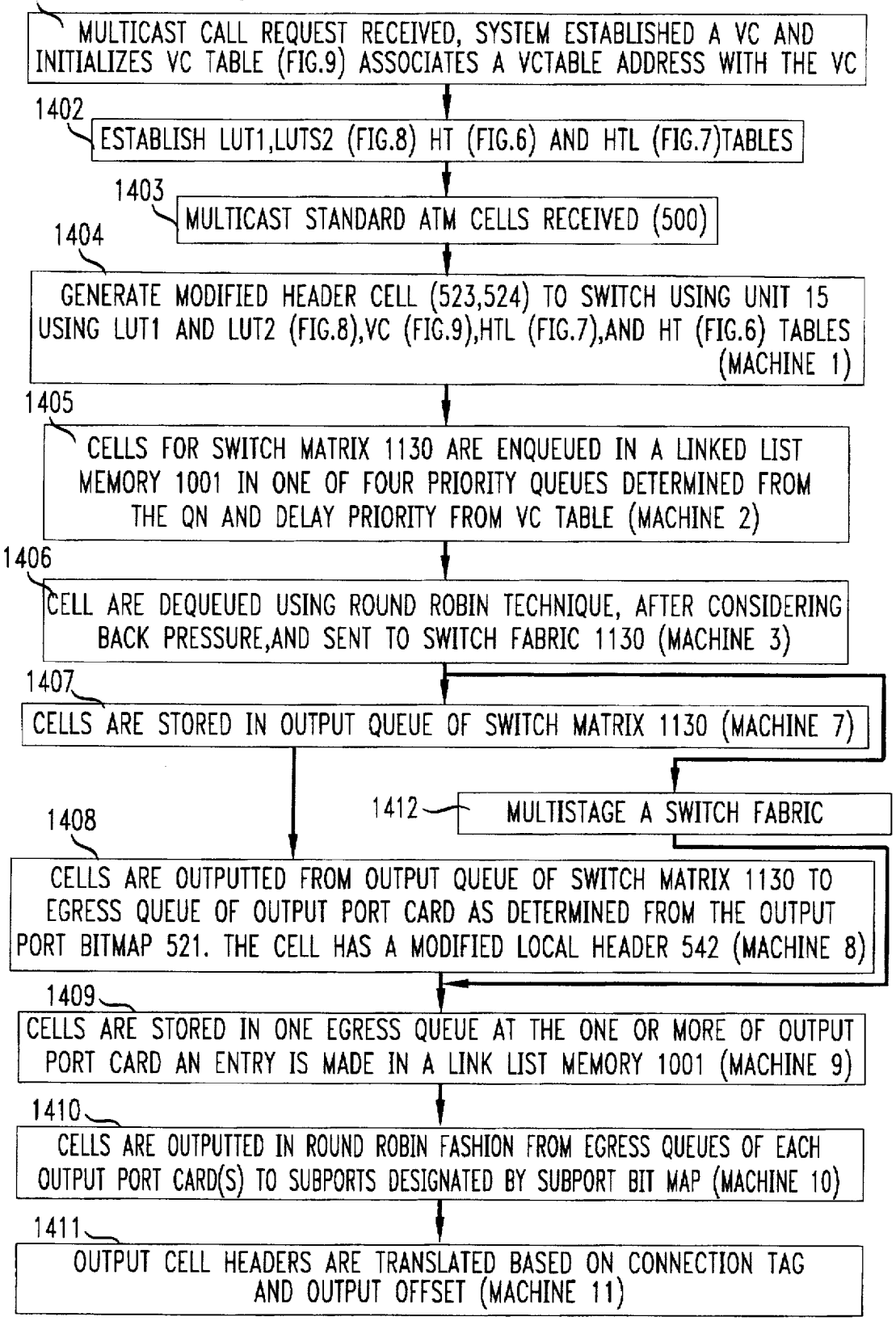

BUFFERING OF MULTICAST CELLS IN SWITCHING NETWORKS

CROSS-REFERENCE TO RELATED APPLICATIONS

Related subject matter is disclosed in our co-pending applications filed concurrently herewith and assigned to the same Assignee hereof: U.S. patent application Ser. No. 08/584,935, entitled "Improved Multicast Routing In Multistage Networks," filed by the same inventors and designated Chiussi-Kneuer-Kumar 2-12-5 and U.S. patent application Ser. No. 08/584,936, entitled "Multistage Network Having Multicast Routing Congestion Feedback filed by the same inventors and designated Chiussi-Kneuer-Kumar 3-13-6 ."

TECHNICAL FIELD

This invention relates to a method of and an apparatus for providing a multicast routing capability in a self-routing multi-stage network and, more particularly, for providing improved minimum-tree multicast routing.

BACKGROUND OF THE INVENTION

An Asynchronous Transfer Mode (ATM) switching network has the goal of providing cell transport from an input port to one (unicast) or more (multicast) output ports. The capability for handling multicast connections is an essential requirement of any ATM switch architecture design. Some ATM switches use minimum-tree multicasting, where multicast cells are replicated as far downstream as possible in the switch. Specifically, a single copy of a multicast cell received in an input port is replicated at each tree vertex as many times as the number of different other vertices or outputs to which it connects. Minimum-tree multicasting minimizes the average queuing delay and the required buffer size of the switch. A continuing problem, however, in ATM switches providing minimum-tree multicasting capability is to avoid the congestion that occurs when delays in one output port affect the traffic destined to other output ports.

SUMMARY OF THE INVENTION

The present invention is directed to apparatus for and a method of multicasting an ingress cell received at one of a plurality of input ports of a switch network to one or more of a plurality of output ports. An ingress cell is received including a data payload and a bitmap segment identifying the one or more output ports to which the data payload is to be outputted. The data payload is stored in an available cell buffer; associated with each cell buffer is a reference counter for storing a number equal to the number of ports to which that ingress cell is to be outputted. The bitmap segment is used to identify output ports to which the data payload is to be delivered, and a plurality of linked list output queues, one for each of the output ports, is established. The bitmap segment is interpreted to identify output ports to which the data payload is to be delivered and an entry is made into the associated linked list output queue. One copy of the data payload is transmitted to each of the identified output ports, according to a sequence determined by the entries in the corresponding linked list queue. At each of the singly linked list queues, an entry is deleted therefrom when the data payload is outputted to an identified output port and the reference counter is decremented by one. When the reference counter equals zero, the cell buffer is made available to another received ingress cell.

BRIEF DESCRIPTION OF THE DRAWING

In the drawing,

FIG. 12 shows the format of a backpressure bitmap;

FIG. 13 shows an illustrative backpressure bitmap; and

FIG. 14 shows a flowchart of typical operating sequences of the present invention.

GENERAL DESCRIPTION

In the following description, each item or block of each figure has a reference designation associated therewith, the first number of which refers to the figure in which that item is first located (e.g., 110 is located in FIG. 1).

Figure 1:
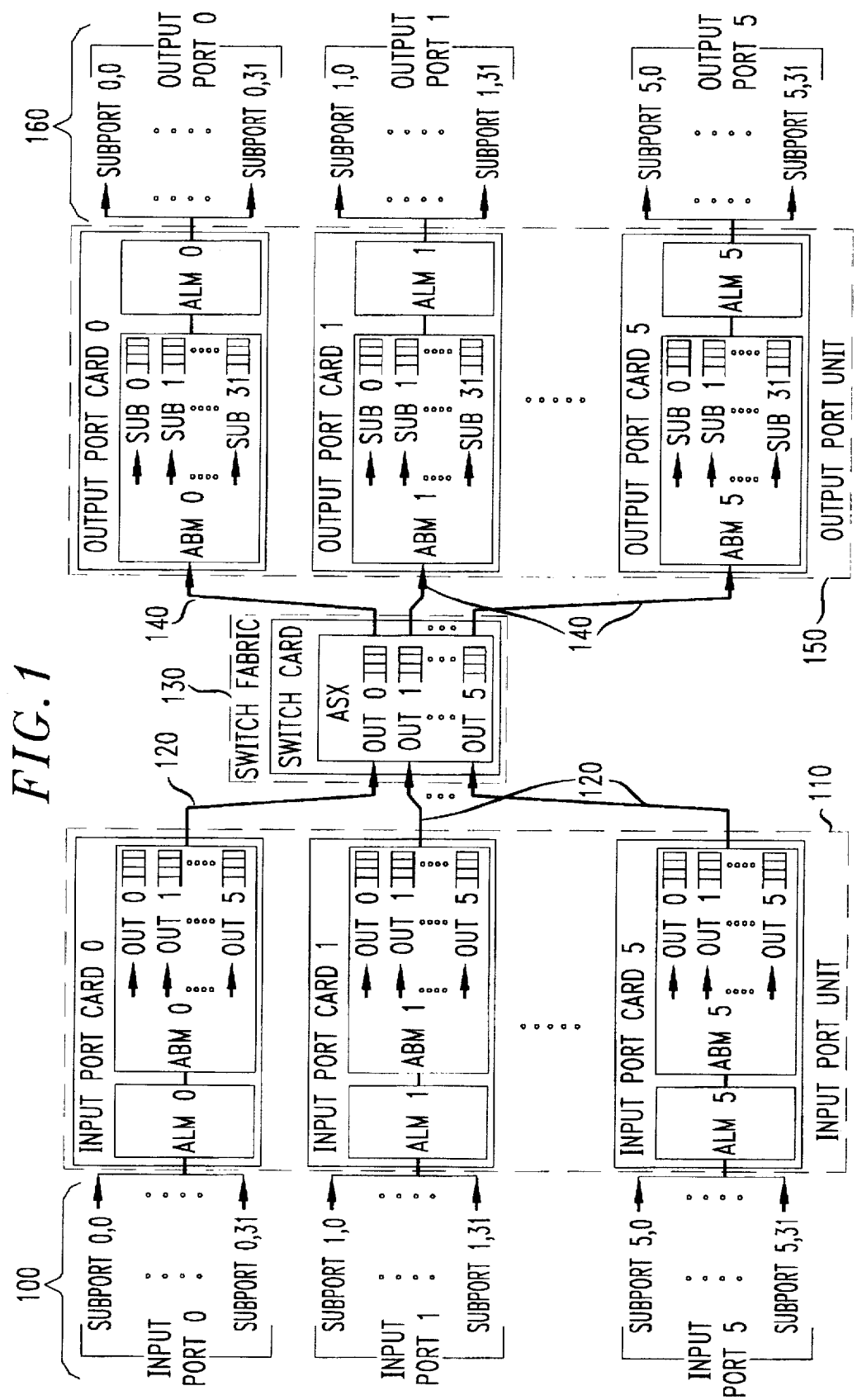
FIG. 1 is an illustrative single-stage ATM switch in accordance with the present invention.

With reference to FIG. 1, we provide an overview description of the operation of the present switch node. The invention provides a technique for multicasting in Asynchronous Transfer Mode (ATM) or similar switches.

FIG. 1 illustrates a representative implementation of the invention in a three-stage switching node or system. In this system, a multiplicity of input port cards of input port unit 110 are each connected by a single internal link 120 to a central interconnecting switch unit (also referred to herein as a switch fabric) 130 that is, in turn, connected by a single internal link 140 to each of a multiplicity of output port cards of output port unit 150. The input port unit 110 illustratively includes six input port cards (0–5) and the output port unit 150 includes six output port cards (0–5). In one embodiment, input port 0 and output port 0 share the same port card 0. Six port cards are shown, each providing interconnection to 32 inputs and 32 outputs. Each port card includes ATM Layer Manager (ALM) and ATM Buffer Manager (ABM) integrated circuits. In one embodiment, the lookup (LUT1, LUT2), translation (TR), policing (POL), and header translation (HT) tables as well as the ingress counter 903 and egress counter 904 (all discussed later) are parts of a single ALM memory unit. External input 100 and output 160 links to the input and output port units are numbered top to bottom, with the 100's digit identifying the input (output) port unit and the lower two digits identifying the subport position within that input (output) port unit. For example, an input subport 1.02 is subport 2 of input port unit 1.

Figure 2:
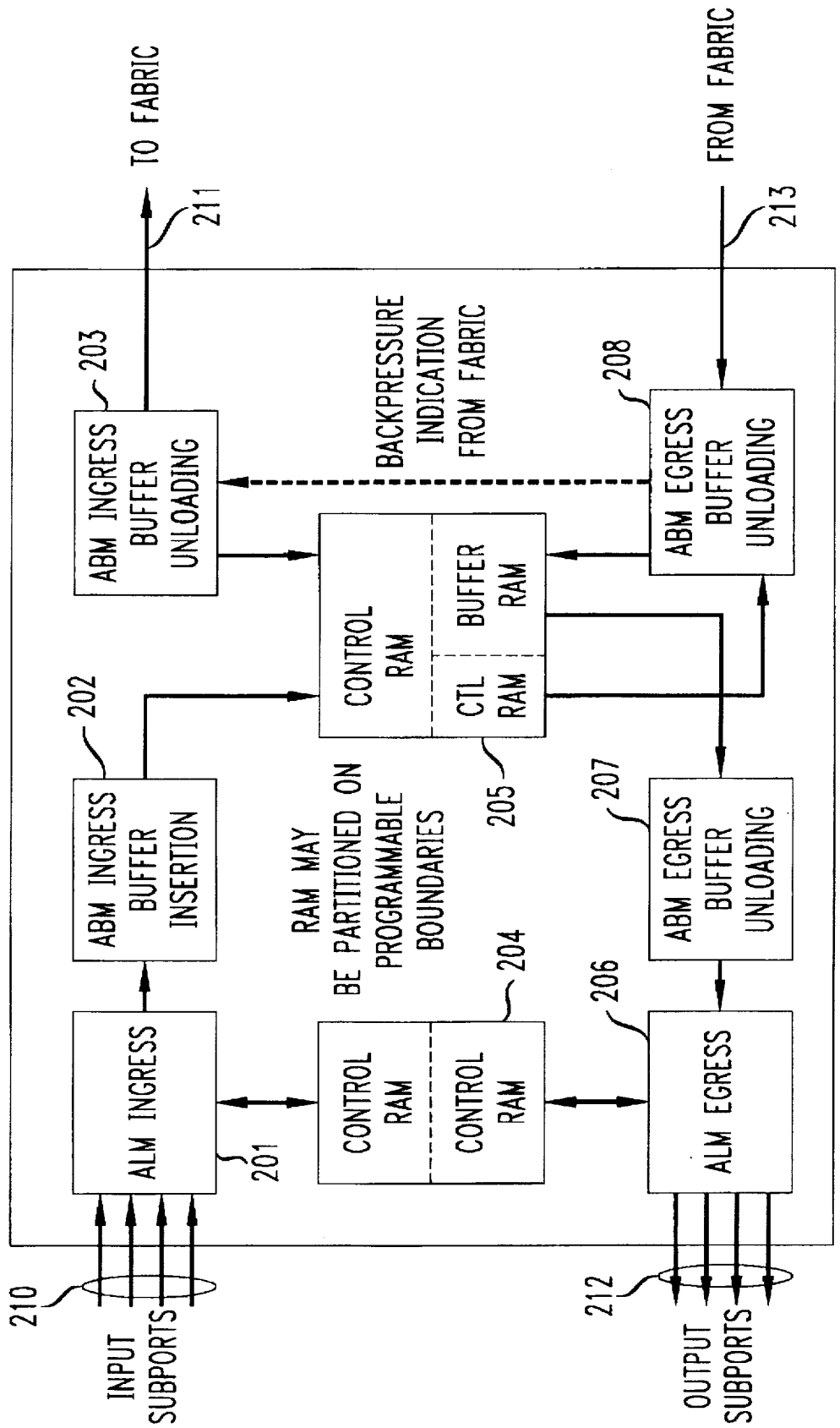
FIG. 2 is a block diagram of a port card.
Figure 11:
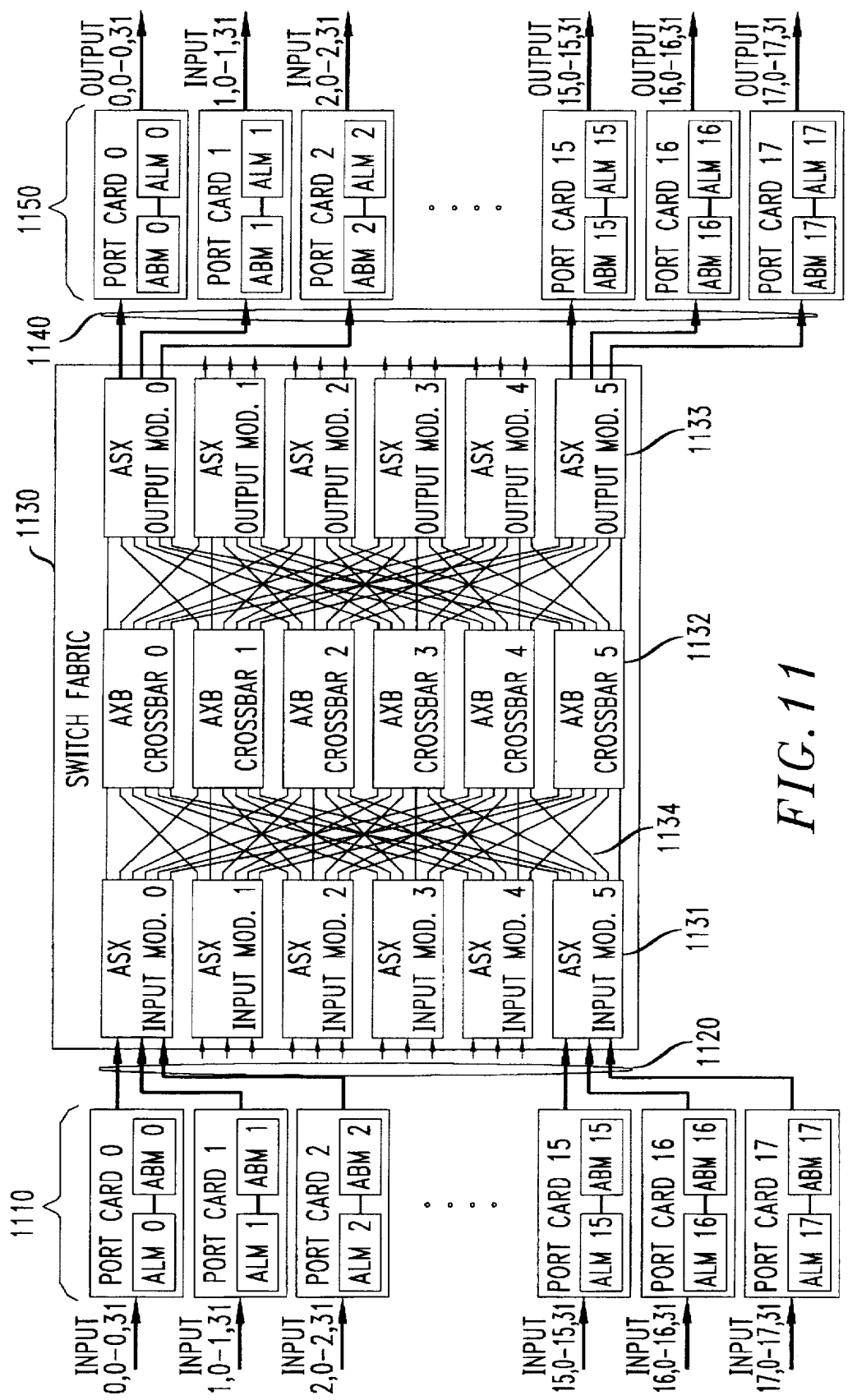
FIG. 11 shows a multi-stage ATM switch utilizing three types of backpressure mechanisms.

With reference to FIG. 2, there is shown a block diagram of an illustrative port card, including several (typically 30) input subport circuits (210) and output subport circuits (211), and a plurality of control logic and RAM memory blocks (201–208) interconnecting those subport circuits with common connecting circuits (212 and 213) to and from the switching fabric (FIG. 1 or, alternatively, FIG. 11). The control logic blocks in the current implementation comprise two integrated circuits, the ATM Layer Manager (ALM) (201 and 206) with its associated RAM memory (204), and the ATM Buffer Manager (ABM) (202, 203, 207 and 208) with its associated RAM memory (205). The input and output subports are normally connected for service to physical layer transmission interface devices (not shown). For purposes of system configuration and administration purposes and for call setup, both the ALM and the ABM are provided with microprocessor interfaces (not shown). The ALM provides ingress policing of virtual connections, routing lookups for the switching fabric, egress virtual circuit address translations, performance statistics, and other functions described in greater detail below and in the state machine descriptions 1 and 11 of the Appendix. The ABM provides ingress and egress buffering, egress multicast routing and rate control to the output subports, congestion management and flow control, additional performance statistics, and other functions described in greater detail below and in the state machine descriptions 2, 3, 9 and 10 of the Appendix.

Figure 3:
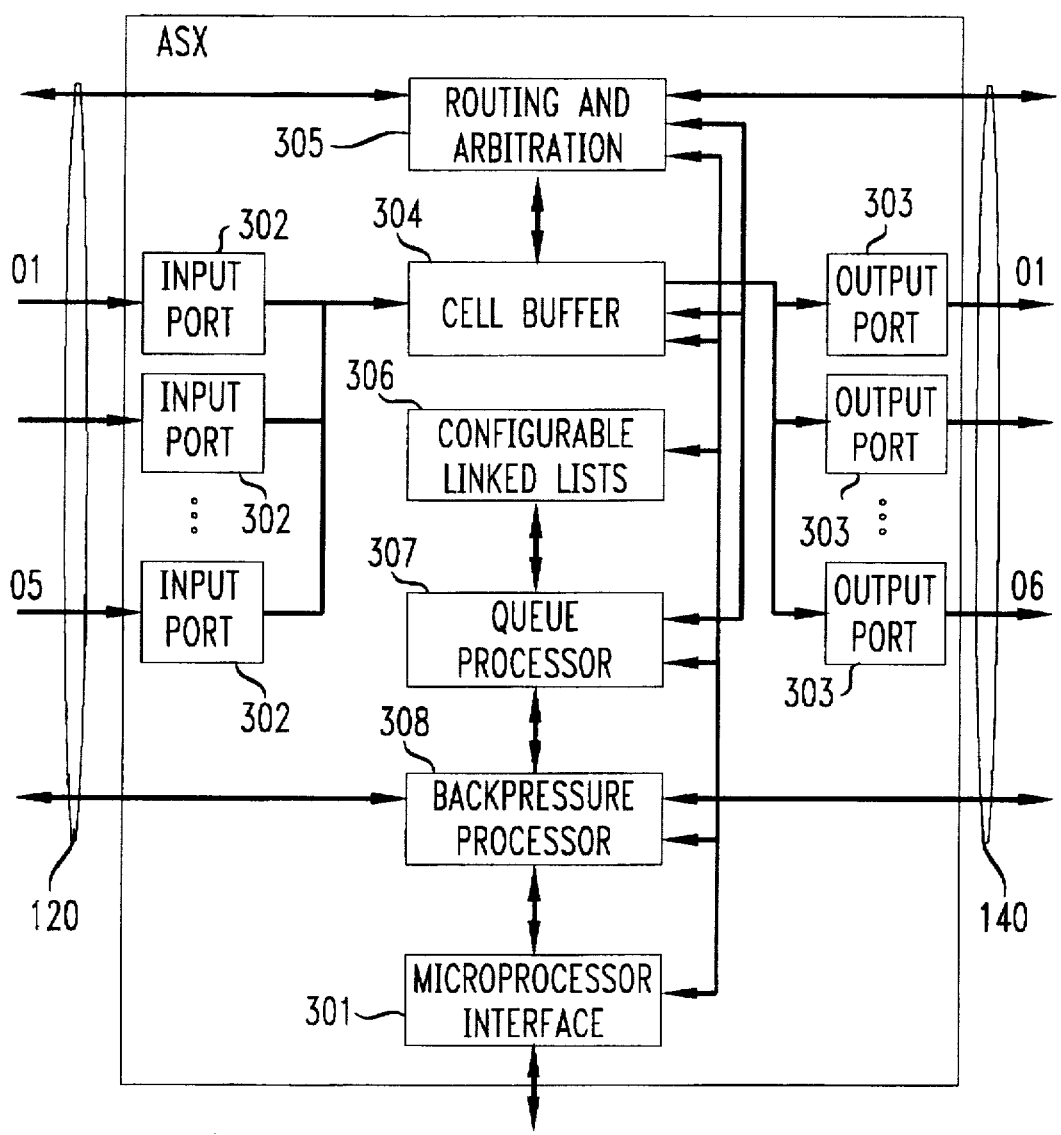
FIG. 3 is a block diagram of a switch module ASX.

With reference to FIG. 3, there is shown a block diagram of a switch module ASX, which comprises the switch fabric 130 of FIG. 1, for interconnecting six input ports IP0–IP5 to six output OP0–OP5 ports. The ASX module is a 6×6 port shared memory switching device which routes any input port to one or more output ports. It supports output queuing, multicasting, single-stage and multi-stage configurations. It also enables a non-blocking lossless switch node operation. It is configured through a microprocessor interface 301. The switch module ASX includes six input port circuits (302) and six output port circuits (303) which connect to the cell buffer unit 304. The cell buffer unit 304 connects to a routing and arbitration circuit 305, configurable linked lists 306, a queue processor 307, backpressure processor 308 and microprocessor interface 301. The routing and arbitration circuit 305 and backpressure processor 308 also interconnect to input and output ports. Six output queues OP0–OP5 of the ASX circuit shown in FIG. 1 reside in cell buffer 304 and linked list 306 and operate in a manner that is similar to that of the ABM circuits of the port card.

With reference to FIG. 11, there is shown an illustrative switch node including an input port unit 1110, a three-stage switch unit (switch fabric) 1130, and an output port unit 1150. The switch node shown in FIG. 11 provides an 18×18 port switch fabric. The input and output port units, respectively 1110 and 1150, are implemented using the same circuitry as the input and output port units, respectively 110 and 150, shown in FIG. 1. The three-stage switch fabric 1130 is implemented having a first (input) stage 1131 including six switch modules ASX, a second (crossbar) stage 1132 including six switch modules AXB, and a third (output) stage 1133 including six switch modules ASX. Each of the six ASX modules of the first stage is configured as a 3-to-6 expander which can receive inputs from any of three port cards and which can access any of the six second stage AXB modules. Each of the six second stage AXB modules is configured as a 6×6 port crossbar which can access any of the six third stage ASX modules. Each of the six third stage ASX modules is configured as a 6-to-3 concentrator which can output to any of three port cards. The ASX modules are the same as those previously described with reference to FIG. 3.

Figure 4:
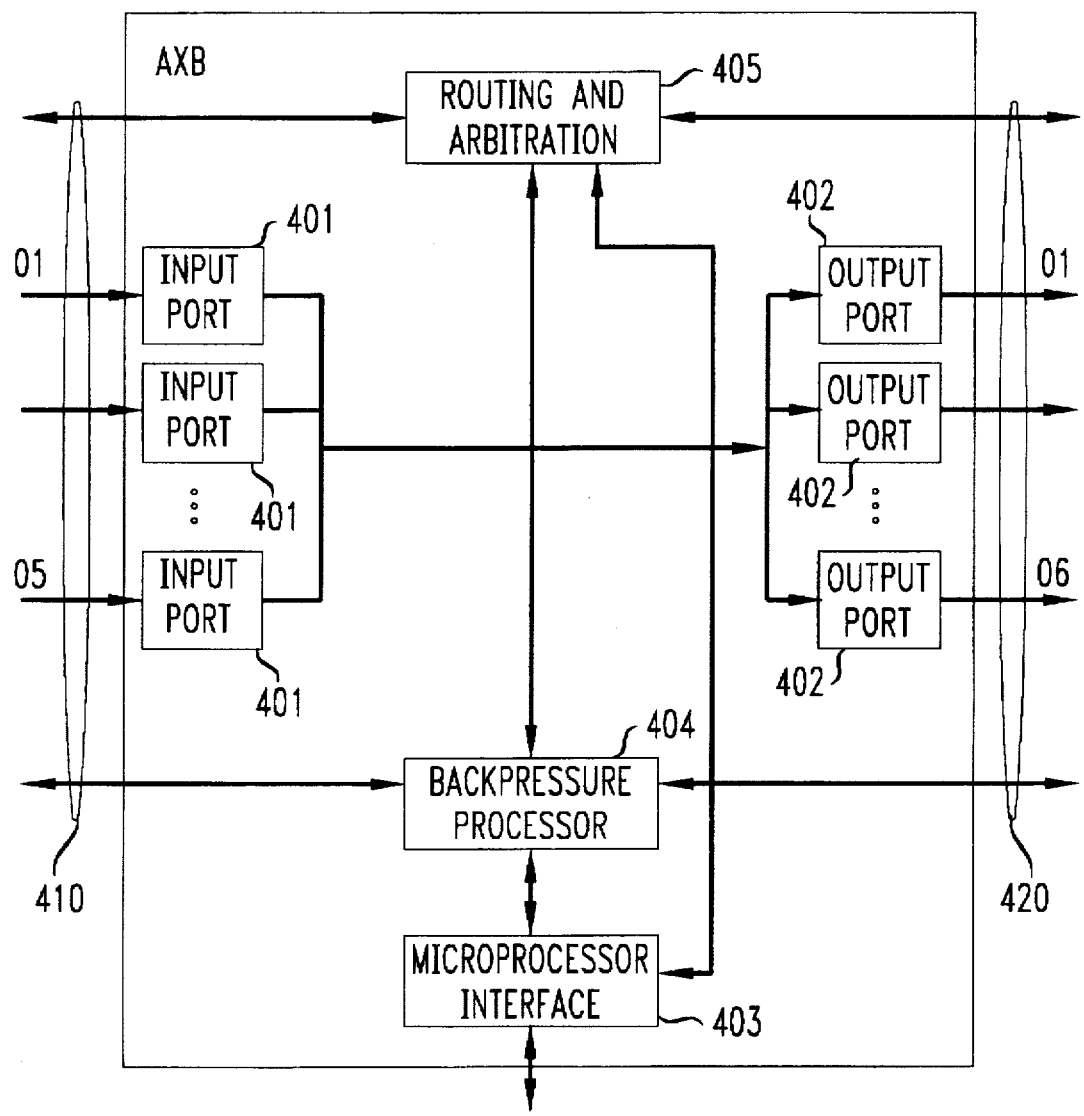
FIG. 4 is a block diagram of a switch unit AXB.

The AXB modules shown in FIG. 4 are processor based and include six input ports 401 which interconnect to six output ports 402 and interconnected microprocessor interface 403, backpressure processor 404 and routing and arbitration circuit 405. The backpressure processor 404 and routing and arbitration circuit 405 also connect via paths 410 and 420, respectively, to the switch modules of the first 1131 and third 1133 stages. The AXB module is a 6×6 port crossbar interconnect device. Much of the functionality of the AXB module is similar to that of the ASX module. However, the only buffering utilized is in the input 401 and output 402 port units. The AXB module, illustratively, does not require internal RAM storage.

By means of our invention, an ATM cell (or similar packet) associated with a multicast request, received at any input port of a single-stage (FIG. 1) or multistage ATM switch system (FIG. 11), may be delivered to any combination of output ports of that switch, as defined by that multicast request, in such a way as to make use of the least possible numbers of storage sites and interconnection links within that switch to arrive at all of the desired outlets (output ports) in a single pass through the switch. To achieve this optimal use of resources, the original multicast request, D, defining a set of desired outlets, is resolved into one or more parts of an explicit set of routes constituting a minimal tree path through the interconnection links of the switch. In accordance with our invention, the representation of these optimum route elements is such that the control components of the switching system, including its storage control mechanisms and its link assignment mechanisms, can interpret them directly to achieve the desired optimal use of the system resources.

Our method for representing each part of the optimum route is to modify or augment the standard ATM cell (500 of FIG. 5) inputted to the switch fabric by modifying the header to include an explicit output port bitmap (e.g., 521 of FIG. 5) of the links to be traversed from its current position, through the one or more stages of the switch fabric, to the desired output ports. The pattern of the output port bitmap to be included is extracted from a translation table (FIG. 9) location identified with the multicast request—typically through reference to a virtual circuit (VC) address (VPI, VCI) within the cell header (501 of FIG. 5). In the case of a multi-stage switch fabric (e.g., FIG. 11), the output port bitmap may identify the tree path through only part of the total number of switch stages. At the end of each partial path, the part of the bitmap already traversed is discarded and a new part of the bitmap is extracted (or generated) and attached, again by reference to the VC address or other system-specific connection information provided in the implementation. This new partial path bitmap represents only elements of the subtree forward of the present switch fabric location toward the output port(s) destinations. With this hierarchical or modular technique of partial path decomposition, each bitmap segment or subtree representation may be held to a small number of bits, while the total path traversed may consist of many more links and ports than could be attached to the cell at any one time or place without compromising the storage and transmission efficiency of the switch node or system.

At each node of the switching system, i.e., at each point of link and/or port interconnection within the switch, a cell may have to be stored to await its turn for access to each forward link in its path. In our invention, a cell is stored once at each switch node, independent of the number of links it must traverse forward from this node. The technique for accomplishing this is, first, that the cell is stored with an added reference count field, where that reference count is automatically derived from the bitmap representation of the number of links forward from the node at which the cell is being stored. Second, as the cell is stored, the information needed to queue it for delivery to each of the links by which it is to pass forward from this node is also stored within the time necessary to serve one cell from each of the incoming links or ports. This concurrent storage of the multicast queuing information assures that if there is room for a cell to enter a node of the switch, its delivery to all forward links and/or ports from that node in its multicast tree is assured. In the implementation described, the concurrent storage of the multicast queuing information is achieved in two different ways:

1. In the highest bandwidth system elements, a fully parallel enqueuing mechanism establishes entries for all of the cell's multicast destinations concurrently with the cell within the cell service time of those elements.
2. In the lower bandwidth elements, and especially in those with large numbers of outputs, the bitmap is stored in a special multicast staging queue concurrently with the cell storage and within the cell service time. Additional timeslots are then provided within the cell service time so that a multiplicity of queue entries can be made from the multicast staging to the output queues, in accordance with the multicast destination bitmap stored with each staging queue entry. By providing a sufficient number of such extra timeslots within each cell service time, the multicast entries can be made at a rate that exceeds the rate at which all cells can physically depart the system. And with such time sharing of the queuing hardware, an overall economy of implementation can be achieved for the lower bandwidth elements.

DETAILED DESCRIPTION

Virtual Connection Information

Figure 9:
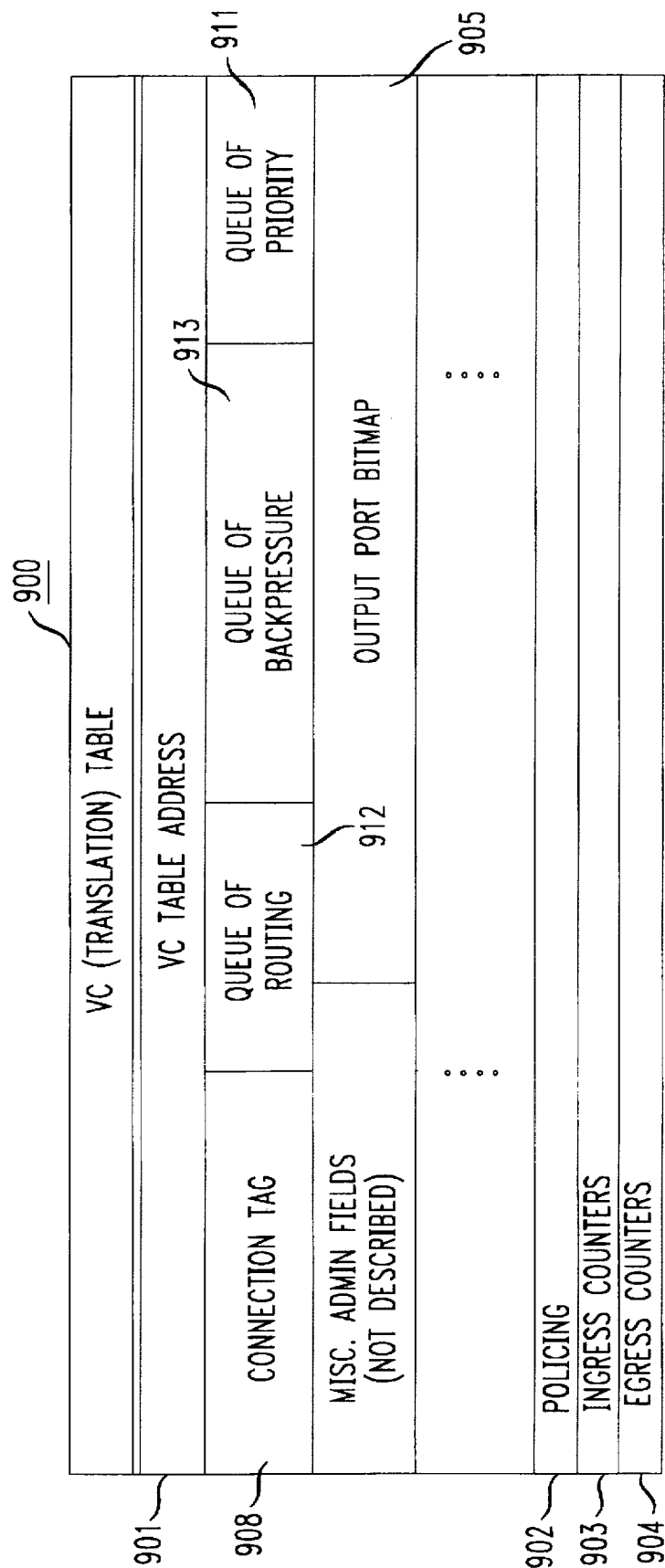
FIG. 9 shows a virtual connection (translation) table used in the implementation of the present invention.
Figure 10:
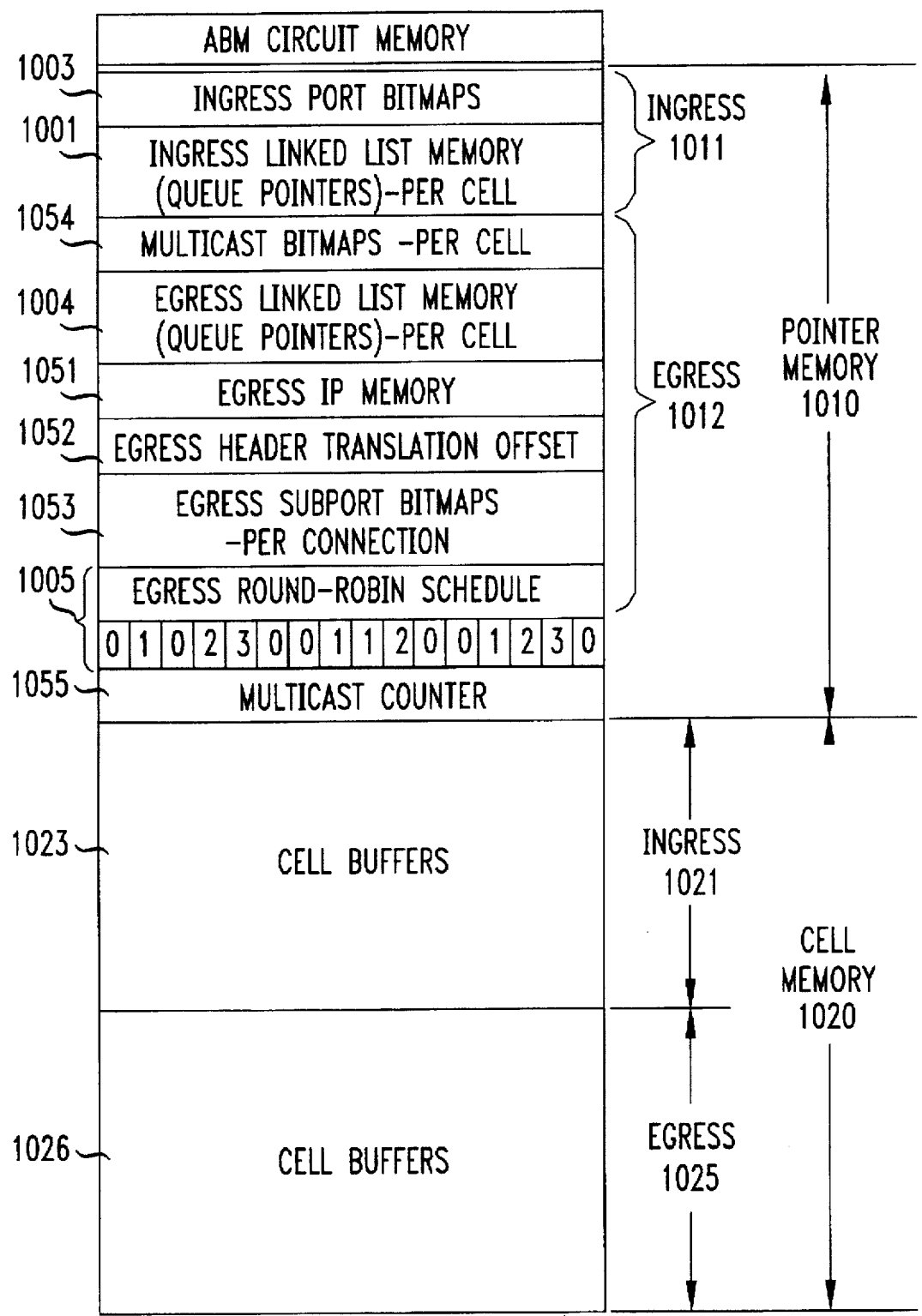
FIG. 10 shows an ABM memory.

With joint reference to FIGS. 9 and 10, we describe the setup of a virtual connection in the switch system of FIG. 1. In response to a caller's multicast request (step 1401 of FIG. 14), the switch system establishes a multicast virtual connection (VC) identifier and initializes a Virtual Connection (or translation) table, 900 of FIG. 9, to store and update information associated with each caller's VC. Each VC table entry, illustratively, consists of three consecutive words 905–907, and has the format shown in FIG. 9. For a specific port card, the size of the Virtual Connection table is a function of the maximum number of incoming virtual connections that the port is designed to support.

The address 901 into the VC table 900 is calculated using the VC_index and a pointer to the base location of the table in memory, as follows:

VC_table_address=VC_table_base+VC_index

This VC table address 901 is used to store information associated with this multicast virtual connection, including:

The Output Port bitmap (e.g., 36 bits wide) 905 indicates the output port(s) of the switch system to which this cell must be routed. For a unicast cell, only a single bit in the field is set to '1'; for a multicast cell, multiple bits are set to '1'. Individual bits 0 to 31 correspond to output ports 0 to 31 respectively of an output card while bits 32–35 identify which output part card 0–15.

The Delay Priority (DP) field 911 provides one of four delay priorities (0–3) for this virtual connection, where a value of 0 has the lowest relative latency.

The Queue of Routing field 912 is associated with an output port and is used by the ingress queuing logic to identify an output queue (Out0–Out5 on the port card) in which to store this cell. On the port card, the port bitmap is not used to determine the output queue.

The Queue_of_Backpressure (QB) 913 is used by the ingress queuing logic to determine traffic congestion in the switch fabric and when to send multicast cells to the switch fabric.

Figure 6:
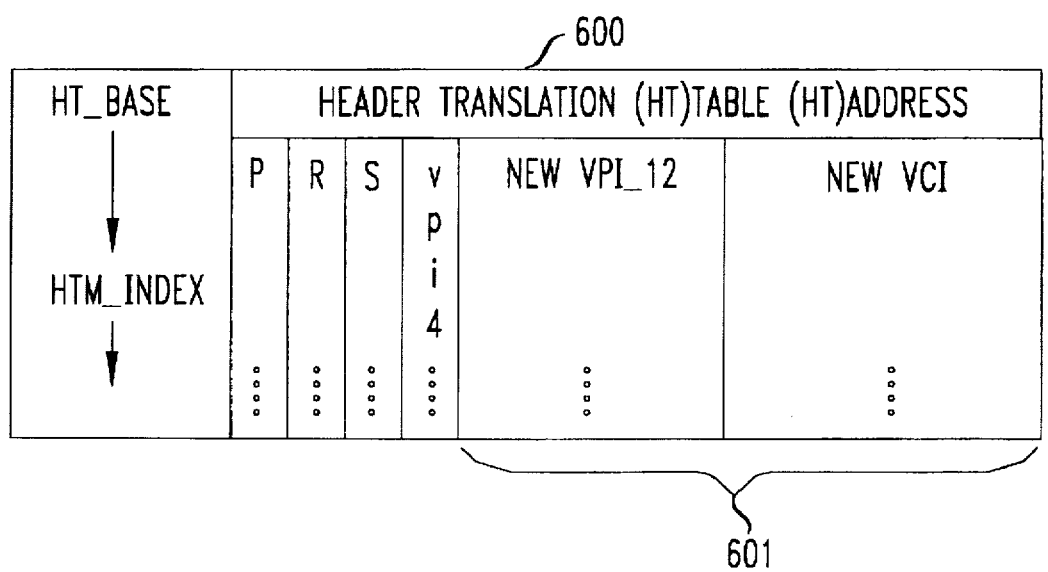
FIG. 6 shows a header translation table.
Figure 7:
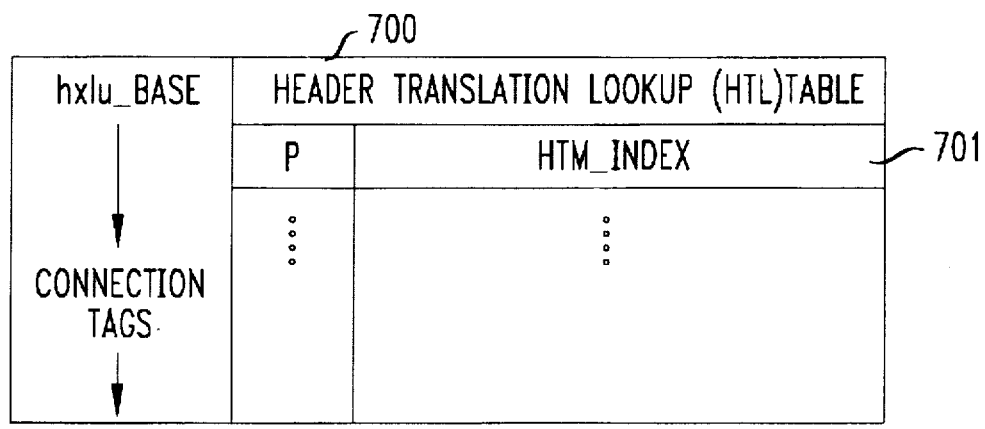
FIG. 7 shows a header translation lookup table.

The Connection_Tag 908 is used to calculate an address (HXLU) into a Header Translation Lookup (HTL) table, FIG. 7, for the port card to obtain an htm_index. From the htm_index, an address into the Header Translation (HT) table, FIG. 6, can be obtained. The HT table is where the outgoing or new VPI/VCI for each connection is stored and accessed. The 16-bit Connection_Tag supports up to 64K outgoing VCs. The HXLU data, HXLU format, HT table data, and the HT table format are described in a later section of this specification.

With the VC table established, the switch system (of FIG. 1 or FIG. 11) is ready to receive standard ATM cells of the requested multicast connection.

Figure 8:
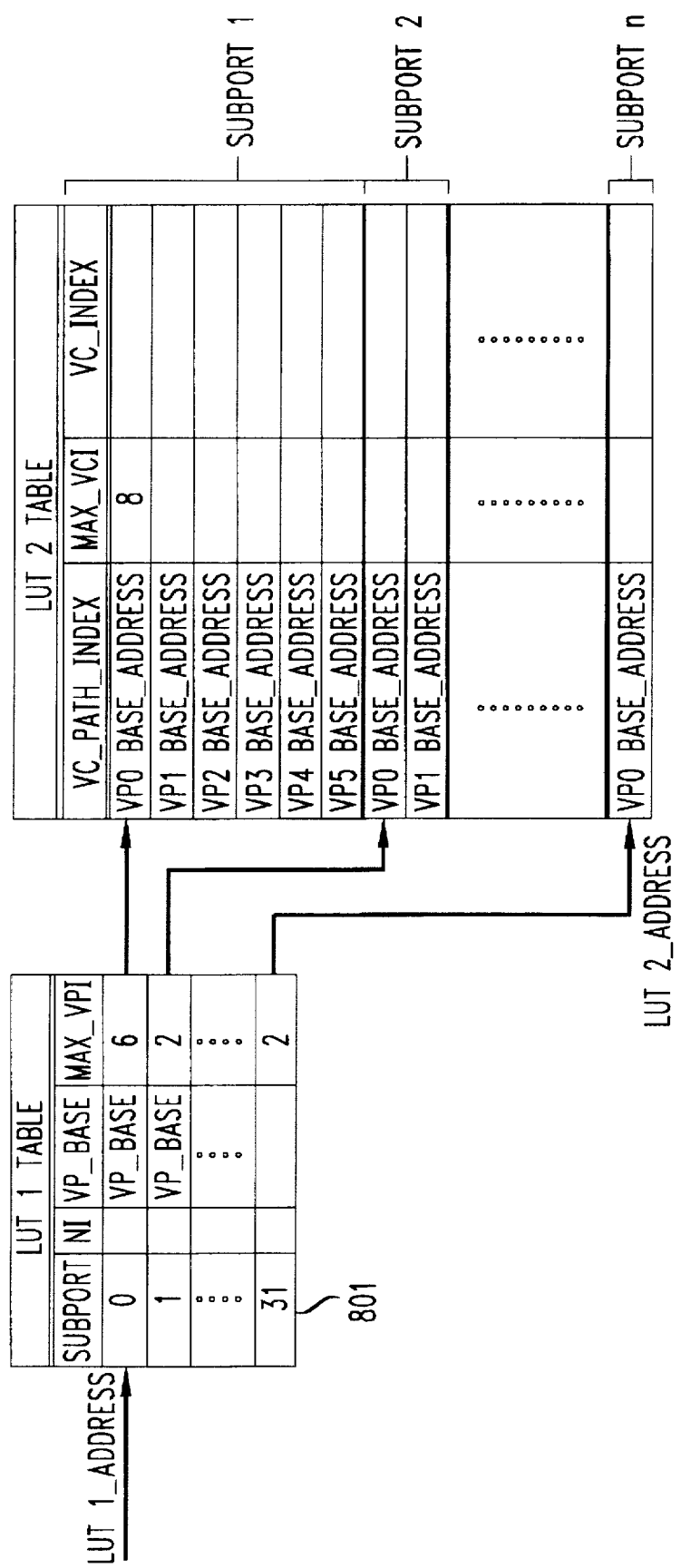
FIG. 8 shows an example of two-level indexing using look-up tables.

In step 1402, the system establishes the lookup tables LUT1, LUT2 of FIG. 8, HT table of FIG. 6, and HTL table of FIG. 7. In step 1403, the multicast cells are received by the system in the standard ATM format.

Figure 5:
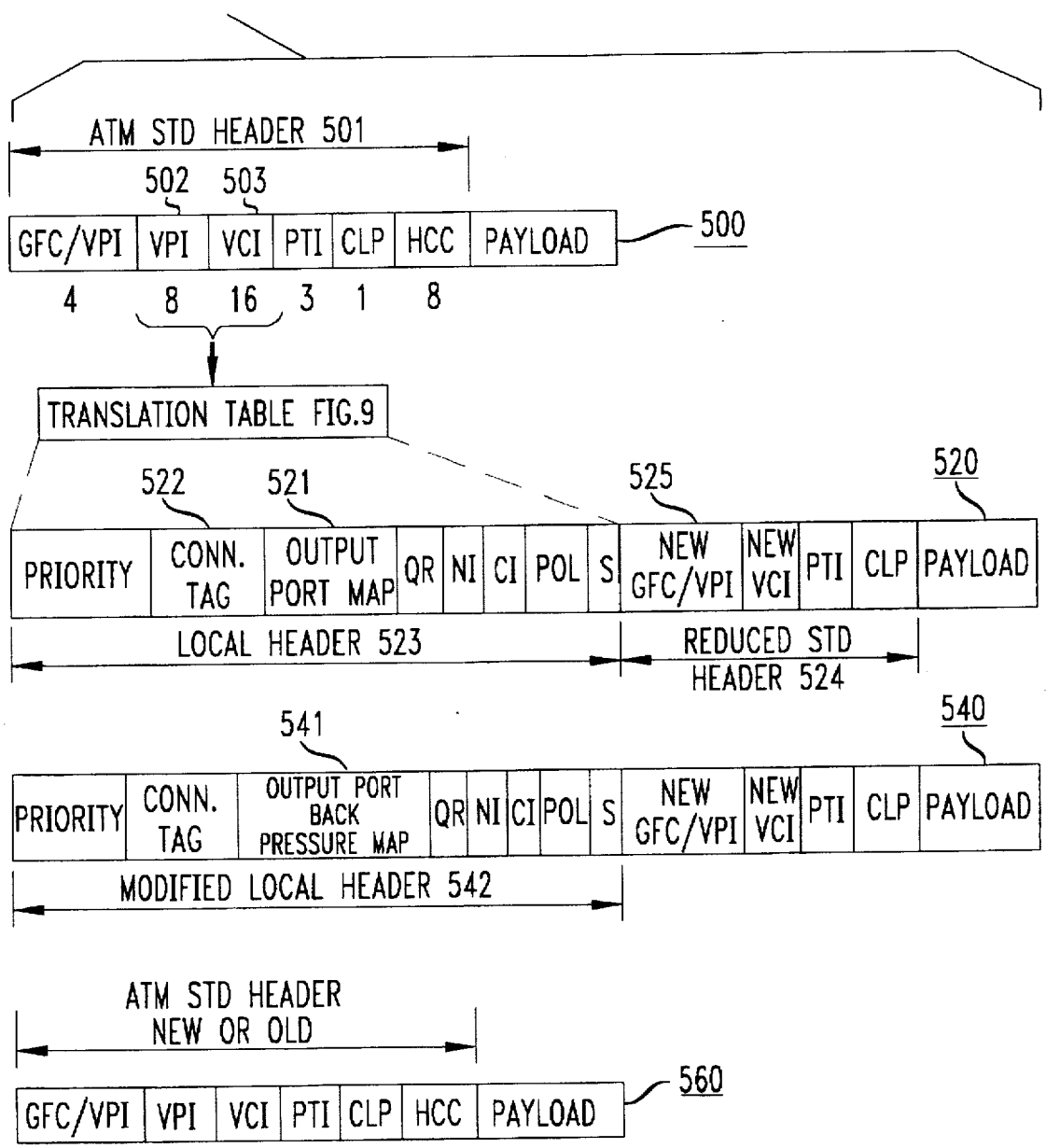
FIG. 5 shows the standard and modified ATM cell formats used by the present invention.

With reference to FIG. 5, we describe the format of the standard ATM cell 500 received at input port units 110 of FIG. 1. The ATM cell format includes a standard ATM header 501 which is five bytes (40 bits) long and a payload which is 40 bytes long. The ATM header has four bits of Generic Flow Control (GFC), eight bits of Virtual Path Identifier (VPI) 502, 16 bits of Virtual Channel Identifier (VCI) 503, three bits of Payload Type Indicator (PTI), one bit of Cell Loss Priority (CLP), and eight bits of Header Error Control (HEC).

The various steps 1404 through 1410 of FIG. 4 are performed by finite state machines in accordance with the present invention. The particular operating details of these various machines are described in more detail in the Appendix of this specification. The operation of a single-stage ATM switch is described by the steps 1401–1411 and utilizes machines 1–3 and 7–11. The operation of a multi-stage ATM switch involves steps 1401–1406, 1412, 1409–1411 and utilizes all of the machines 1–11 described in the Appendix.

In step 1404 (performed by machine 1), the header of the ATM cell is modified by the input port card. The modified format of the egress cell outputted (over links 120 of FIG. 1) from input port units 110 and inputted to switch unit 130 is shown by 520 to include a local header 523, a reduced-standard header 524, and a payload. In accordance with the invention, the VPI and VCI segments of the standard header 501 are used to access lookup tables LUT1 and LUT2 of FIG. 8, the VC (translation) table of FIG. 9, the HTL table of FIG. 7, and HT table of FIG. 6 to generate the local header. The illustrative local header includes a plurality of segments including a priority bit (P), connection tag 522, output port map 521, queue of routing (QR), service feature information (NI,CI), policing information (POL), and an S-bit. The reduced-standard header 524 includes the GFC, VCI, PTI, and CLP segments of the standard header which are obtained during a header translation process. Header translation is described in detail in the following paragraphs.

Header Translation

Our illustrative switch node of FIG. 1 can operate with standard UNI and NNI interfaces. For a UNI interface, the five-bit subport number, the eight least significant bits (LSBs) of the VPI 502, and the 14 LSBs of the VCI 503 create a potential address space of 27 bits. For an NNI interface, an additional four VPI bits (the GFC bits of the header of ATM cell 500) are used to create a potential address space of 31 bits. Each port card maps all possible virtual connections to a maximum of 64K usable addresses per port card.

A Virtual Connection Index (VC_Index) is used to calculate a VC_Address into a VC table 900 (also referred to as a translation table) (FIG. 9) to obtain an output port bitmap 905 (also referred to as a multicast bitmap) associated with a particular virtual connection. Two levels of indexing are used. For a UNI interface, the first level maps each subport into a space of up to 8K unique VPI connections. For an NNI interface, the first level maps each subport into a space of up to 64K unique VPI connections. For both UNI and NNI interfaces, the second level maps each VPI connection into a space of up to 64K virtual connections. FIG. 8 shows an example of two-level indexing using lookup tables LUT1 and LUT2. The subport number 801 is used as the access LUT1_Address to obtain a VP_Base and MAX_VPI numbers from the table LUT1. If the VPI 502 (received in the ATM cell 500) falls between the number VP_Base and VP_Base+MAX_VPI, the ATM cell is accepted. Otherwise, it is rejected. The VP_Base+VPI 502 is used as the access address to table LUT2 (LUT2_Address) and is used to obtain a VP_Base, MAX_VCI, and VCI_Index. The ATM cell 500 is accepted if the VPI 502 received is less than VP_Base+MAX_VCI. Otherwise, it is rejected.

As shown in FIG. 8, the virtual connection VC table address 901 obtained from table LUT2 is VP_Base+VC_Index which is used to access the VC (translation) table 900, policing table 902, and the ingress counters 903 of FIG. 9.

With reference to FIG. 9, the policing table 902 is accessed in the same manner as translation table 900 and provides memory and control information for standard "UPC" operation. That is, it is used to mark or re-mark the cells.

The ingress counters 903 and egress counters 904 are used to gather statistics on the result of policing.

The VC translation table 900 provides access for each virtual connection, using the VC table address 901, to the output port bit map 905, connection tag 908, delay priority 911, and Queue of Routing (QR) field 912.

The output port bitmap field 905 provides, for our exemplary multicast connection, a map from the input port 102 through the interconnecting switch unit 130.

Once the translation table 900 entry for a multicast connection has been accessed, header translation can occur.

Header translation is used to generate the local header 523 and reduced standard header 524 for egress cells read from the subport queues of input port units 110. The header translation occurs by accessing a Header Translation (HT) table 600, shown in FIG. 6, which consists of the following fields: P (odd parity over word); R (reserved); S (VP Switch Flag); vpi4 (control bit to indicate whether to replace the GFC/VPI header bits); new VPI_4 (4 most significant bits MSB of VPI); new VPI_8 (8 least significant bits LSB of VPI); and new VCI (16 bits).

As previously noted, new VPI and VCI values 601 were stored in the Header Translation (HT) table of FIG. 6 by the microprocessor for each outgoing VC during call setup. The control bit stored with the new VPI/VCI values, called "vpi4 bit", determines how the 4 MSBs of the new VPI are handled. These values, together with the VP switch flag S, and the ATM header 501 are used to generate the new, modified header (local 523 and reduced-standard 524 header) for the egress cell 520 of FIG. 5.

The PTI and CLP bits are read from the ATM header 501 and inserted into the reduced-standard header 524 of the egress cell 520. The S bit determines whether the original VCI (stored in the ATM header 501) or the new VCI (stored in the HT table 600) is inserted into the outgoing reduced-standard header 524. The vpi4 bit determines whether the GFC field (stored in the ATM header 501) or the new VPI (4 MSB bits of the new VPI stored in the HT table 600) is inserted into field 515 of reduced-standard header 524. The remaining bits of the new VPI (8 LSB bits of new VPI stored in the HT table 600) are also inserted into field 525 of reduced-standard header 524.

To generate modified header segments 523 and 524, access must be made to the appropriate HT table 600 entry, via a two-level lookup. The connection tag of word 907 of VC table 900 is used as an index into the Header Translation Lookup (HTL) table of FIG. 7. The address of a word in the HTL table, hxlu, is found from:

$$hxlu\_address = hxlu\_base + connection\ tag.$$

The hxlu_address of the HTL table stores an index (htm_index 701) that points to htt_address in HT table 600, FIG. 6, associated with the connection tag. The htt_address is used to obtain the new VPI and VCI values, as well as the S and vpi4 bits for a given egress cell which is stored in local header 523 and reduced-standard header 524.

The address of a word in HT table 600 is found from:

$$htt\_address = htt\_base + htm\_index + htm\_offset.$$

For a unicast cell, the htm_offset (also referred to herein as a multicast address offset) is defined equal to zero. For a multicast call, multiple headers, one for each multicast output port, are stored in consecutive memory locations. For each output port connection of the multicast call, the appropriate htm_offset is used. The htm_offset is used to address each of the multicast headers.

To support 64K egress VCs, 64K words of memory are required for the HTL table 700.

The format of the cell which is outputted (over links 140 of FIG. 1) from switch 130 and inputted to output port units 150 is shown as 540 in FIG. 5. The format of cell 540 includes a modified local header 542 (with the output port map segment having been replaced by an output port backpressure map), the reduced-standard header, and the payload.

The format of the cell which is outputted from output port units 150 is shown by 560 in FIG. 5. The cell 560 is the standard ATM cell shown by 500 except that it has a new VPI segment and may or may not have a new VCI segment.

According to the disclosed embodiment, all of the tables of FIGS. 6, 7, 8 and 9 are stored in an ALM memory of the ALM integrated circuit of a port card.

Multicast Connection Processing

The following example will describe multicast connection processing provided at the input port unit 110, switch unit 130 and output port unit 150.

As a processing example, consider a cell arriving at input port 102 (i.e., subport 1,02), associated with a multicast connection request for delivery to output ports 101 (i.e., subport 1 or port card 1, output port 01), 104, 203, 204, and 402. The delivery of the multicast cells occurs through a virtual connection (VC) established between input port 102 and the requested output ports. As previously discussed, in steps 1401 and 1402, when the multicast connection is first established, the switch system of FIG. 1, in response to the caller's multicast request, establishes the LUT1, LUT2, VC, HTL and HT tables including entries such as an output port bitmap PBM, queue number QN, delay priority DLP, and connection tag and associates VPI and VCI identifiers with all cells sent during the multicast connection. In step 1403, the VPI and VCI identifiers are then included as part of the header of each ATM cell (see 500 of FIG. 5) sent by the caller during that multicast connection. The VPI and VCI identifiers enable the input port 102 to generate, in step 1404, the modified header 523 and 524. The output port bitmap 521, identified in the modified header 523 and 524, enables the switch node to establish the desired virtual connection between the input port 102 and the identified output ports.

In our example, the output port bitmap for output port 101 (i.e., output card 1, output port 01) would have a '1' in bit 1 and all '0's in bits 0, 2-31 in the Output Port bitmap 905 of VC table 900 of FIG. 9 and bits 32-35 of Output Port bitmap 905 would be binary encoded to "0001" to represent output card 1.

The ATM cell 500 is processed by ATM Layer Manager (ALM) and ATM Buffer Manager (ABM) circuitry located in a port card. In our example, since the ATM cells arrive at input port 102, the ALM1 and ABM1 of port card 1 would process the ATM cells For our exemplary multicast request, each ATM cell is to be delivered through the interconnecting switch unit 130 to output port cards 1, 2 and 4, with a representative payload bit pattern "1101".

Ingress Queuing

In step 1405 (performed by machine 2), when the cells are inputted to the port card 1 from input subports (e.g., input port 102), they are stored in ABM memory (FIG. 10). The ABM memory (FIG. 10) has two separate memory sections to store information associated with a cell: the pointer memory 1010 and cell memory 1020. Each is subdivided into areas corresponding to ingress 1011, 1021 and egress 1012, 1025 sections. The storage address for the cells is obtained from a linked list 1001 of available memory addresses (i.e., a free list). The linked list 1001, arranged on a cell basis, is used to access cell buffers in the ingress section 1021 of cell memory 1020.

In a well-known manner, an indexing scheme is used to keep track of each cell on linked list 1001. An index is not a physical memory address, but rather is an offset into a table. These indices are chained to form a linked list, each index being a pointer to the next entry in the linked list. The pointers are allocated and stored in the queue pointer section of linked list 1001. There is a one-to-one correspondence between the pointers in ingress linked list memory 1001 and the cells stored in cell buffer 1023. This means that the head register of a given list stores the index of the cell stored in cell memory.

The ingress port bitmap (word 521 of local header 523) is stored in ingress port bitmap section 1003 of pointer memory 1010.

Cells leaving the input port card destined for the switch fabric 1130 are read from cell memory 1020 and taken off or dequeued from an ingress linked list 1001. In each timeslot, an incoming cell is stored in cell memory 1020 and a cell from memory is sent to the switch fabric 1130.

To dequeue a cell, step 1406 (performed by machine 3), it is removed from an ingress (input) queue 1001 and sent to the switch fabric 1130 once per timeslot in accordance with a read selection algorithm. According to our read selection algorithm, described as machine described as machine 3 in the Appendix, queues are visited in order on a round-robin basis. If a queue is empty or if all of the delay priorities (Pr0–Pr3) in a queue are backpressured (described in detail in machine 3), then that queue loses its opportunity and is skipped by the selection logic.

After step 1406 (performed by machine 3) has outputted a cell, that cell is processed by the switching fabric as described in step 1407 (performed by machine 7). When a single-stage, single device is implemented, the operation of that device, steps 1407 and 1408, is essentially similar to that described for machines 7 and 8 (described in a later paragraph). The significant difference is that queue backpressure is signaled directly to the output port card rather than indirectly through the crossbar process (described as part of machines 5, 6 and 7).

Because the routing bitmap already covers the routing through the interconnecting switch unit 1130, no VC-to-routing map lookup function is required. The operations within the interconnecting switch unit 1130 are relatively straightforward and are similar to the previously described operation of the ABM circuit memory of FIG. 10.

In step 1408 (performed by machine 8), in any of the multiplicity of output queues (Out0–Out5) of the interconnecting switch unit 1130 to which the cell in question has been assigned, after all other entries ahead of that cell in question have been served, the multicast cell is extracted from the cell buffer 1023 of the input port unit, the stored reference count is decremented by one, and the cell is delivered across the link 1140 associated with that queue to the output port units 1150 as shown in FIG. 10. If the decrement operation on the reference count results in a zero value, this indicates that all of the queue entries for that cell have been served, and the associated cell buffer in the interconnecting switch unit is marked as free.

In the exemplary implementation of FIG. 10, the initial routing bitmap only extends through the input port and interconnect switching stages 1130. Therefore, on entry to the output port unit, a second reference must be made to that unit's VC-to-map lookup circuit (i.e., LUT1, LUT2 and TR tables).

Egress Queuing

The following section provides an overview of egress queuing on the output port card.

In step 1409 (performed by machine 9), cells which enter the output port card from the switch fabric 1130 are stored in the egress section of cell memory (e.g., 1025 of FIG. 10) until they can be transmitted. The egress cells are organized into 32 output subport queues with four priority linked lists per queue. Each linked list corresponds to a different delay priority.

The queue number QN and delay priority DLP from the virtual connection (VC) table 900, FIG. 9, identify one of egress queues and one of four lists for a given cell and are used to enqueue the cell on the appropriate egress linked list 1004.

For each of the lists, the following values are maintained:
head
    pointer to the first cell of the list
tail pointer to the last cell of the list An indirect-pointer scheme is used to keep track of each cell on a list. Small blocks of index values, called index pairs (IP), are chained to form a linked list 551. Each IP contains two fields:

cell index
    index to the first word of the cell data
next index
    pointer to the next entry in the linked list The IPs are allocated and stored in egress IP memory 1051 separately from the cell buffer 1023. This means that the head of a given list points to an IP: one index gives the location of the cell and the other index gives the location of the next IP. This requires two free lists: one for the IPs (IP free list) and one for the cells (egress free list).

The egress queuing of the output port card uses the egress pointer memory 1012 and egress cell memory 1025 of FIG. 10

The egress pointer memory 1012 contains the following data for the egress side:

IP free list (stored in the egress IP memory 1051)
Egress free list and multicast lists (stored in the egress linked list memory 1004)
Egress lists (32 queues×4=128 subport lists; stored in egress IP memory 1051)
Egress header translation offsets (stored in the egress header translation offset table 1052)
Subport bitmaps (one per incoming connection; stored in the egress subport bitmap 1053)
Subport multicast bitmaps/multicast counters (one per egress cell that is stored in cell memory; stored in subport multicast bitmaps area 1054)
Round-robin schedule (stored in 1005)

The egress index pair (IP) memory 1051 includes an IP free list and all active queue entries for the various egress subports. The index pair (IP) free list is a linked list of index pairs (cell index and link pointer) in 1051 of the pointer memory 1010 that is defined to store egress IPs. The list consists of head and tail registers which point to the first and last entries in the list. An egress IP consists of two words, where the first word is the cell index and the second is the next index. The cell index field is 15 bits, sufficient to address up to 32K egress cells in the cell memory 1020. The first free address is found from the value of the next index stored in the head register of the egress IP free list. IPs taken from the free list and linked to the various subport egress queues are modified with the cell index of the stored cell in egress cell memory 1025. Thus, several entries on various subport queues can all reference the same cell storage location.

The egress linked list memory 1004 contains both the egress free list and the multicast staging linked lists. The egress free list is a linked list of free blocks in the pointer memory used by both unicast and multicast cells. The free list consists of head and tail registers which point to the first and last entries in the list. A multicast staging linked list entry consists of one word—the next index pointer. The next index pointer is sufficient to address up to 32K multicast cells in the cell memory. Each multicast list, one for each priority, consists of head and tail registers which point to the first and last cells in the list.

When the multicast queue links a cell onto a subport queue (e.g., Sub0), the offset associated with the subport queue is stored in 1052. The offset will be used during header translation to find the header translation entry for the particular leg of the multicast. Them is one header translation offset for each cell index pair (IP) in egress IP memory 1052.

The subport bitmap 1054 consists of 32 bits, each bit corresponding to a subport on an egress port card. Each incoming VC connection has an associated connection tag and subport bitmap 1054. The subport bitmap 1054 is written by the port card microprocessor at the time a VC connection is set up. It is accessed after a cell arrives from the switch fabric 1130 to determine the egress subport queue to which the received cell is written. The subport bitmap for a specific connection is located in 1054 using the connection tag data corresponding to the connection. For a unicast cell, only one bit of subport bitmap 1054 is set and the cell is appended to the corresponding subport list. Subport multicast is discussed in a later paragraph.

In step 1410 (performed by machine 10), when a multicast cell comes to the head of a multicast list, the subport multicast bitmap 1054 is retrieved in order to determine where copies of the cell are destined. Each multicast cell in cell memory 1020 has an associated subport multicast bitmap 1054 stored in the pointer memory 1005. Once the subport multicast bitmap has been read by the entry at the head of the multicast queue, a multicast address offset is stored in its place. Each egress cell in cell memory is associated with a unique 5-bit (32-count) multicast counter 1055 which determines how many copies of the cell are to be created. The multicast count is initialized to '1' when a unicast cell is received from the switch fabric and written into cell memory. When a multicast cell is received from the switch fabric, the multicast counter is not initialized until after the subport multicast bitmap has been read and scanned by the multicast queue. The multicast counter 1055 for a given cell is decremented each time a cell is read from a subport queue. When the multicast count equals 0, the multicast cell location is moved to the egress free list. The next multicast cell in the linked list 1004 comes to the head of the multicast list.

The round-robin schedule consists of a variable number of entries stored in 1005 in pointer memory 1010. One entry is read per timeslot.

One cell is removed from a subport queue and sent to the output subport 1160 during each timeslot. The read selection algorithm is similar to that of the previously discussed ingress side. However, instead of serving the queues in strict order, the queues are serviced using a weighted round-robin schedule 1005 of variable length. Each entry in the table specifies the subport number to read this timeslot, as well as a 'no cell read' value.

Subport output rate is determined by the frequency at which a particular subport appears in the schedule An illustrative schedule length (L) of 461 permits data rates from 1.5 Mbps to 622 Mbps in 1.5 Mbps steps. Using N as the number of entries referencing a particular subport queue and L as the total schedule length, the possible rates are calculated as:

$$\text{Rate} = (N/L) \times 622.08 \text{ Mbs} \quad (1 \leq N \leq L)$$

The delay priorities are serviced in the subport queues in exactly the same manner as in the ingress side, using 16-entry weighted round-robin schedules previously described.

The data format of an egress cell from a subport as shown by 560 is the same as that of the ingress cell except that the VPI is new and VCI may or may not be new.

Subport multicast operations proceed as follows:

For each cell received from the switch fabric 130, the connection tag is used to access the subport bitmap stored in pointer memory 510. If more than one bit in the subport bitmap is set to '1', then the cell received is a multicast cell.

The cell is temporarily stored on a special multicast queue until it is sequentially transferred to all of the proper subport queues on an interleaved basis with any unicast cells of other virtual connections.

For example, it is assumed that the queue processor has sufficient capability to enqueue two cells and dequeue one cell each timeslot. If there are any cells waiting on the multicast queue, then one of the enqueued cells is taken from the multicast queue and sent to the proper subport queue. Under full load, when a new unicast cell arrives every timeslot, this results in multicast cells interleaved 1:1 with unicast cells on a particular subport list. Of course, if an idle cell is received from the switch fabric, it can be substituted for by one of the multicast cells. A given cell remains at the head of the multicast queue until it is written to each of the subports to which it is destined, as specified in the subport bitmap. Since a multicast cell can be written to up to 32 subport queues, there may be 32 different egress IPs for the cell, all containing the same value in their respective cell_index fields, i.e., each pointing to the same cell in cell memory. When the cell is written to each of the subport queues, it is removed from the head of the multicast list and the head register of the multicast list is updated.

For our exemplary multicast request, the output port unit at the upper fight of FIG. 10 will yield a bitmap representation for ports 101 and 104, say "1001". We take this case to describe the second implementation, that for lower performance elements, as described in paragraph 2 above. As with the original translation (in the input port unit), the presence of a valid routing map entry causes the cell to be stored in a free place in the cell buffer of the output port unit, but in this case without the multicast routing bitmap and with a reference count equal to the number of '1's in the multicast bitmap.

Concurrently with the storage of the cell, an entry containing the multicast routing bitmap and a pointer to the cell storage buffer is entered into the multicast staging queue of the output port unit. Typically this staging queue would also be a FIFO queue. As multicast entries come to the head of the staging queue, the output port unit logic distributes them, one at a time, to the final egress queues (lines 101 and 104 in the example), each with a copy of the pointer to the cell storage buffer. By providing a sufficiently high service rate at the output of the multicast staging queue, one copy of the control logic can serve all copies of the multicast at a rate greater than the delivery rates to the final output ports. A speedup factor of only two is sufficient to meet this objective for cell inputs in any combination of multicast requests that can possibly be delivered through the final output ports.

Finally, as prior queued entries are serviced at the output ports, the two copies (at 101 and 104 in the example) will be emitted and the cell buffer reference count will be decremented, and as above when the cell buffer reference count reaches zero, the cell buffer will be marked free.

Backpressure is utilized to ensure lossless operation of the switch fabric (i.e., switch units 130 and 1130) and to prevent any one output port from seizing a disproportionate share of the cell memory due to an overload condition. Backpressure is applied selectively to each delay priority of each queue. During each timeslot, the maximum number of memory locations allocated to any queue list is dynamically updated. If the size of any list exceeds that calculated threshold, a backpressure status bit corresponding to that queue list is asserted. Collectively, the status bits are referred to as the backpressure bitmap. The backpressure status for each queue list indicates whether or not a cell from a particular queue list should be transmitted to the next stage of the switch fabric or output port. Backpressure bitmaps provide congestion feedback from the egress side of output port card 1130 to third stage modules 1133; third stage modules 1133 to second stage crossbar modules 1132; second stage modules 1132 to first stage modules 1131; first stage modules 1131 to the ingress side of the output port card 1110.

In step 1411, performed by machine 11, output cell headers are translated based on connection tag and output offset as described in tables 6 and 7.

Multi-stage Switch Unit Configuration

With reference to FIG. 11, we describe the three types of backpressure mechanisms utilized in the multi-stage switch unit 1150 configuration. These backpressure mechanisms represent logical paths rather than actual physical connectivity paths. For example, there is no actual physical connection from a first stage module to the ingress side of a port card.

Third Stage to Second Stage

Prevention of buffer overflow on the third stage, caused by the second stage, is effected in two parts. During the first part, backpressure information is transferred from the third stage modules 1133 to each second stage crossbar module 1132. During the second part, the second stage communicates with the first stage modules 1131, as discussed in a later paragraph.

Every timeslot, each third stage module 1133 checks to see which Queue of Record (QR.) counters have exceeded the current dynamic threshold. The bits corresponding to lists which have exceeded the given threshold are set in a backpressure bitmap. The backpressure bitmap from each module 1133 is directly conveyed to each crossbar module 1132 by dedicated paths. Consider the 18×18 port switch fabric 1130. The backpressure bitmap format for modules configured to support three output ports is shown in FIG. 12. Hence, each output module transmits 12 bits of information to each crossbar module 1132 of FIG. 11. As a result, each crossbar receives a complete backpressure bitmap corresponding to up to 18 output ports once per timeslot.

Second Stage to First Stage

Returning to FIG. 11, the second stage modules 1132 to first stage modules 1131 backpressure is asserted to prevent buffer overflow on the third stage modules 1133 or to avoid output line contention on a crossbar module 1132. The second-to-first stage feedback is conveyed via a dedicated path. The second stage provides the following feedback to the first stage modules: accept; buffer full in third stage module; output line not available on second stage module.

First Stage to Ingress Side of the Port Card

Backpressure from first stage modules 1131 to input port cards 1110 is asserted to prevent buffer overflow on the first stage modules 1131 of the switch fabric 1130. Application of backpressure is based on whether the size of a linked list (AL counter) exceeds a calculated threshold. Feedback is conveyed to the ingress side of the line cards directly connected to the given input stage module.

The backpressure signaling occurs in two parts. First, the backpressure bitmap is transmitted from a first stage module to the corresponding third stage module out of band. Each input stage module keeps a backpressure bitmap for the 18 queues which it handles, as shown in FIG. 13. It takes two timeslots to transfer backpressure bitmaps corresponding to each plane from the input stage to the output stage. In single-plane fabrics, each first stage module 1131 communicates backpressure information to one third stage module 1133 via a dedicated path.

The output stage module of an 18×18 port switch fabric takes the backpressure maps from each plane and multiplexes the information onto the port bitmap of outgoing ATM cells. The output module outputs bitmaps corresponding to ports 0–8 and 9–17 sequentially every two timeslots. Hence a complete 72-bit bitmap is transferred once every two timeslots. When the bitmap corresponding to ports 0–8 is transmitted to an outgoing ATM cell, the backpressure map sync bit is set to '1'; otherwise, the bit is set to '0'.

In the event that no cell is destined to a given port card, an idle cell is generated to carry the backpressure bitmap to that port card.

Egress Side of Port Card to Third Stage

Each output port card also provides four bits of backpressure status, one for each delay priority, to its corresponding third stage module 1133 of the switch fabric 1130 in-band via cells being transmitted from the ingress side of the port card 1110 to the switch fabric. The four bits of information are transmitted serially over the course of four timeslots, starting with delay priority 0 and ending with delay priority 3. An egress backpressure sync bit (3) accompanies the information. It is set to '1' when delay priority '0' is sent. Otherwise, it is set to '0'. First stage modules strip off the two bits of backpressure information from incoming ATM cells and convey that information along with the first-stage egress side of the output port card backpressure status to the corresponding third stage modules 1133 via a dedicated path. In the event that an input port card has no cells targeted for the switch fabric, the ABM generates an idle cell to carry the delay priority backpressure information to the switch fabric. When a backpressure bit for a given delay priority and output port is asserted, the given third stage module 1133 stops selecting cells for transmission to that output port.

According to another embodiment of the invention, a high-performance implementation alternative, previously referred to in paragraph 1 of the General Description, is described. The multicast cell, with its attached routing bitmap, appears on the input bus at the specific time (one or more clock intervals, not necessarily contiguous) scheduled for serving the interconnecting link from its input port unit. During this reserved time, the cell is copied to a free location in the cell buffer of the interconnecting switch unit, without its multicast routing bitmap but with a reference count of the number of bits set in that bitmap. Concurrently with the copy, the bits of the bitmap are used to initiate parallel queuing operations in those queues identified by the bitmap and associated with the internal links and output port units through which the cell will ultimately be delivered. By thus providing parallel hardware and concurrent operation, the clock rates of highest throughput elements of the system can be reduced.

Illustrative Embodiment of the Invention

An illustrative, more specific implementation of the multicast routing techniques of the present invention is represented in the attached Appendix. The Appendix describes the operating sequences (in a high-level pseudo-code format) for each of eleven processing machines which together perform the functions of the present invention. For purposes of this description, a machine is defined as a controller that runs from an input to an output in a well-defined program sequence. A machine is implemented as a well-known finite state machine using state registers and combinatorial logic. When data are stored in buffers for various lengths of time, the buffers serve as outputs and then as inputs to machines, and the "sequencers" on either side are most easily understood as separate machines.

Before we describe the operating sequences for each of the machines, a few general statements are made which pertain to all of the machines described. The operating sequences utilize well-known high-level program control statements (e.g., if, then, else, etc.). Comments which explain particular functions or applications of the program statements are preceded by "//", e.g.,//this is a comment.

The operation of the various machines and the data flow between these machines will be described with particular reference to the multi-stage ATM switch embodiment shown in FIG. 11 along with FIGS. 1, 3, 4 and others.

Machine 1 describes the operating sequence for ALM ingress operations (for ALM 0–ALM 17 of input port unit 1110 of FIG. 11) which is performed at all input subports.

Machine 2 describes the operating sequence for ABM ingress buffer insertion (for ABM 0–ABM 17 of input port unit 1110 of FIG. 11) for each cell received from an ALM.

Machine 3 describes the operating sequence for ABM ingress buffer unloading (for ABM 0–ABM 17 of input port unit 1110 of FIG. 11) during each cell period.

Machine 4 describes the operating sequence for the first-stage ASX switching input buffer insertion (for each ASX input module 0–5 of FIG. 11, with joint reference to FIG. 3) for each input port.

Machine 5 describes the operating sequence for the first-stage ASX switching output buffer unloading (for each ASX of FIG. 11, with joint reference to FIG. 3) for all of the parallel queue lists (over their respective four priority levels).

Machine 6 describes the operating sequence for center-stage AXB crossbar switching device (for each AXB crossbar 0–5 of FIG. 11, with joint reference to FIG. 4) for each input port, cyclically from a "random" starting point and in "random" order from that point.

Machine 7 describes the operating sequence for third-stage ASX switching input buffer insertion (for each ASX output module 0–5 of FIG. 11, with joint reference to FIG. 3) for each input port to an ASX.

Machine 8 describes the operating sequence for third-stage ASX switching output buffer unloading (for each ASX output module 0–5 of FIG. 11, with joint reference to FIG. 3) for each output port of an ASX.

Machine 9 describes the operating sequence for ABM egress buffer insertion (for ABM 0–ABM 17 of output port unit 1150 of FIG. 11, with joint reference to FIG. 3) for each cell received from an ASX output module.

Machine 10 describes the operating sequence for ABM egress buffer unloading (for ABM 0–ABM 17 of output port unit 1150 of FIG. 11, with joint reference to FIG. 3) for each output subport, in a round-robin sequence.

Machine 11 describes the operating sequence for ALM egress (for ABM 0–ABM 17 of output port unit 1150 of FIG. 11, with joint reference to FIG. 3) for each cell available from the associated ABM.

What has been described is merely illustrative of the application of the principles of the present invention. Other arrangements and methods can be implemented by those skilled in the art without departing from the spirit and scope of the present invention. In particular, the description in terms of a specific number of sequential machines partitioned over a specific set of four integrated circuit devices is for clarity, and the principles of operation described could be realized in other configurations using fixed or programmable logic or processors of suitable performance.

Chiussi-Kneuer-Kun... - 11-4

Appendix

The following operating sequence (or flowchart) describes the operation of the individual processing "MACHINEs" of a multistage ATM switch (FIG. 11) in accordance with the present invention. A MACHINE is a controller that runs from an input to an output in a well-defined program sequence. When things are stored in buffers for variable lengths of time, the buffers serve as outputs and then inputs, and the "sequencers" on either side of the buffer are most easily understood as separate MACHINEs. The following description partitions the example implementation into eleven distinct MACHINEs, numbered 1 through 11.

In the following flowcharts, comments are preceded by "//" so:

// This is a comment

Key words like "FOR" and "IF" are in CAPITALIZED BOLDFACE.

Things that are unique to the present invention are *emphasized by italics*.

Important system logical or numerical values are bold or *bold italic*.

Two block diagrams, FIG. 1 and FIG. 2, in addition to FIG. 11, illustratively show the data flow relation among the machines.

MACHINE: 1. – ALM Ingress (201)

FOR

*All Input Subports (210)*

DO

IF

*Port has a cell available*

THEN

*Read the cell into the ALM*

// The next operations cover the VC based *lookup table (LUT)* functions on ingress.

*The VP/VC virtual circuit identifier is the reference index for all ATM layer control functions. In the following step the reference implmentation uses a double indirection of VC identifier and VP identifier via LUT1 (801) and LUT2 (802) to index the VC Table (900), but other techniques such as "hashing" are equally applicable.*

*Index through LUT1 and LUT2 to the VC table entry for the cell*

*From the VC table entry obtain: a output port bitmap (905) for destinations through the switching fabric, a unique connection tag (908)), the delay priority (911)), a queue of routing number (912)), and a queue of backpressure number (913), and insert all of them into the local header to be carried with the cell*

22

Chiussi-Kneuer-Kumar 1-4

> *Do standard traffic "policing" (902), discarding or flagging the cell as optioned for the VC*

IF

> *The cell is for a multicast VC circuit*

THEN

> *Update the queue of backpressure value in the VC Table for use by the next cell of this VC*

END IF

END IF

DONE

END MACHINE

MACHINE: 2. – ABM Ingress Buffer Insertion (202)

FOR

> Each cell from the ALM *Based on the queue of routing (912) and the delay priority (911), identify the buffer list (1001) to which the cell is to be queued*
>
> // There are a variety of threshold classes and methods that are applicable under standards recommendations and implementations. The present invention implements dynamic thresholding (c.f. co-pending and commonly assigned U.S. patent application Ser. No. 08/318007, filed October 4, 1994 by A. K. Choudhury and E. L. Hahne and entitled "Dynamic Queue Length Thresholds In A Shared Memory ATM Switch") for cell acceptance under different values of cell loss priority (CLP) as set by the source and possibly updated by policing, as well as for decisions on partial packet discard (PPD) and early packet discard (EPD) congestion management.
>
> *It is a novel feature of our invention that dynamic thresholding has been extended to multiple programmable thresholds for the different priority classes and types of decisions (e.g. CLP, PPD, EPD). This multiple dynamic threshold technique is applied generally for the other points of threshold decision described in the following sections of this description.*
>
> *In this instance, for the ABM Ingress Buffer Insertion application, the version of the dynamic thresholding scheme is characterized by the function*

$$T = \alpha \left( B - \beta \sum queuelength \right)$$

> *where $\alpha$, $\beta$ and $B$ are programmable parameters and may be different for each of the priority classes and types of decisions. The parameter $\alpha$ is typically implemented with a value of $2^n$ but this is not essential*

Chiussi-Kneuer-Kumar 11-4

*to the invention. Without loss of generality, β can be restricted to values 0 and 1, with the value 0 corresponding to static thresholding. The sum of queuelength is the sum of all cells in ABM ingress queues. The parameter B is the effective buffer size, which may differ from the actual buffer size. In the reference implementation, the result of computation is truncated to the next smaller integer.*

For the specifics of the present inventions operation, however, it is only necessary to identify that a threshold decision is made at each point.

DO

IF

*The buffer list is over the discard threshold*

THEN

*Discard the cell*

ELSE

IF

*The cell is acceptable but is over a congestion threshold*

THEN

// *Provision of this feature at this point is important for completeness of congestion management implementation, as provided at successive stages of the architecture. The present invention includes techniques to support explicit rate (ER) calculations in available bit rate (ABR) service. These include per VC reporting of port queue occupancy for all normal cells and overall buffer occupancy for resource management (RM) cells.*

*Mark the stored cell with a local congestion flag (CI in 523)*

END IF

// *In the case of the ingress port buffers, each priority level of each queue is divided into two subqueue linked lists, one for unicast and the other for multicast, to support "multicast backpressure bypass" described below. The following describes the special measures to append to these subqueue lists.*

*The specific techniques for multicast backpressure bypass are a feature of the present invention for improved multicast performance, but they are not essential to its overall operation in either unicast or multicast applications. In the sequel we will note where simplification is possible. In particular the scheme involves the*

24

Chiussi-Kneuer-Kumar 1-4

*queue of backpressure calculation in the ALM (described above), and that also can be removed.*

*All of the section immediately following, through the end of the ABM Ingress Buffer Insertion MACHINE could be replaced by a simple queue list for the indicated queue of routing and priority without reference to the various cell type variables.*

*Set flag "current cell type" as unicast or multicast as appropriate*

*Get "last linked cell type," for the subqueue list pair. Values may be:*

*null*

*unicast or*

*multicast*

IF

*The last linked cell type is null*

THEN

*// Both subqueue lists must have been empty.*

*Set flag "next list type to serve," to the value current cell type*

ELSE

*Mark the next linked cell type for the cell at the tail of last linked cell type list with the current cell type*

END IF

IF

*The current cell type subqueue list is empty*

THEN

*Link the cell to the head of the current cell type list and mark its next linked cell type as null*

ELSE

*Link the new cell to the tail of the current cell type subqueue list and mark its associated next linked cell type as null*

END IF

*For the list pair, mark the flag last linked cell type with the current cell type*

END IF

DONE

END MACHINE

MACHINE: 3. – ABM Ingress Buffer Unloading (203)

// The ABM receives the ingress backpressure bitmap *(541,) indicating backpressure status for all central switching fabric outputs at all priorities. The ABM get this pattern from the fabric via overhead in the egress cell stream (specifically, through reuse of the output port bitmap field (521).) This is relevant to the reference implementation described here, but is not a required implementation.*

*During each cell period update the local* backpressure bitmap *as received from the fabric*

FOR

*All queues*

DO

// *Forming the specific "*queue can be served*" values for each queue*

*Initially, set* queue can be served *as false*

FOR

*All priorities*

DO

IF

// *Note: Without multicast bypass the following test would be implemented on a single queue without reference to* queue of backpressure.[1]

*The* unicast list *(entries in 1001) is not empty at this priority*

AND

*the backpressure bit for this priority is* OFF

---

[1] We consider at least two alternatives to the queue of backpressure method described here:

I. Take a logical OR of the backpressure bits for all of the output ports identified in the multicast map for the cell. This is clearly more restrictive than the queue of backpressure method.

II. Consider backpressure status on just the queue of routing, but require that the central switching fabric condition that backpressure on the multicast destinations. We specifically consider an implementation in the fabric in which a cell that is queued for multicasting to multiple output ports is counted against the backpressure threshold of the queue of routing, so long as it is still in memory and awaiting delivery through any of its destination ports.

OR

> The multicast list *(entries in 1001) is not empty at this priority*
>
> AND
>
> *the backpressure bit for this priority for the head cell's queue of backpressure (913) is OFF*

THEN

> *Set the "queue can be served" as true*

END IF

DONE

DONE

// *The present invention further refines the round robin by a weighted priority schedule to select a priority to be served according to weighted round robin selection algorithm. Such a policy is not novel to the present invention or essential to the claims, but it is an element of the reference implementation.*

*Select the queue to be served (independent of priority) by round robin arbitration, circularly from (and not including) the last position served to the first position at which the queue can be served value is true*

*Save the newly selected queue to be served position as the last position served to be used in the next round*

*Use weighted round robin (or any other priority policy) to select the priority to be served*

*Each time the last position served value "wraps" circularly beyond the highest port number, the current weighting position is incremented circularly (round robin priority service only)*

// *This is the invented algorithm for multicast backpressure bypass*

*The key control values to recall from the enqueuing and queue selection developments above are:*

1. queue to be served

2. priority to be served

*The following control values are specific to the combination of the queue to be served and priority to be served*

3. unicast queue can be served at this priority

4. multicast queue can be served at this priority

5. next list type to serve

*Based on the above described queue selection procedure, we are sure that at this point there is a cell available to be served at this queue and priority*

*In the following description of a reference implementation we describe unicast as being able to bypass a backpressured multicast, and also permit a multicast that is not backpressured (because its current queue of backpressure differs from its queue of routing) to bypass a backpressured multicast. This is an implementation decision, but our technique would also allow asymmetrical application of bypassing to favor unicast (or vice versa).*

*NOTE: In systems not implementing any form of multicast bypass the following operations through the end of the ABM Buffer Unloading MACHINE would be reduced to operations on a single queue.*

IF

*The next list type to serve (unicast or multicast) can be served at this priority*

THEN

// *This is the normal (unbypassed) case.*

*Set the cell to send from buffer to be the cell at the head of the next list type to serve subqueue and unlink it from that list*

*Set the indicated next list type to serve to the next linked cell type of the selected cell (possibly null)*

ELSE

// *This is the bypass case.*

*Set the cell to send from buffer to be the cell at the head of the subqueue opposite the next list type to serve and unlink it from that list*

*Hold the indicated next list type to serve to be the bypassed next list type to serve*

END IF

// *A special check is needed here, because the indicated queue could have drained during an earlier bypass*

IF

*The indicated next list type to serve queue is empty*

THEN

// *Special case: the indicated list has been drained by bypass.*

Chiussi-Kneuer-Kumar 1-4

> *Set the next list type to serve to the subqueue opposite the indicated next list to serve*

END IF

*Send the cell to send from buffer, including its local header, through the output port to the switching fabric*

END MACHINE

// *In this reference implementation we describe a central fabric of three stages in a memory-space-memory (MSM) configuration.*

MACHINE: 4. – First-Stage Switching (ASX) Input Buffer Insertion (304-308)

// *This flow chart is similar to that of the ABM Buffer, but in the reference implementation does concurrent linking of multiple queue entries for multicast connections. The latter is essential in the reference implementation to make the ASX able to keep pace with the multiple Input Port Units that it serves.*

FOR

*Each Input Port (302)*

DO

IF

*A cell is present from this input port*

THEN

// *The backpressure discipline in the ALM ingress buffer unloading section guarantees that there will always be a free buffer.*

*Store the cell in the shared single-copy cell buffer (304)*

*Mark the reference count for the stored cell to be 0*

*Clear the third-stage destination register*

FOR

*Each bit of the output port bitmap*

DO

IF

*That bit is on*

THEN

29

Chiussi-Kneuer-Kumar 11-4

```
                    Set the bit of the third-stage destination register for the
                    parallel queue group (306 and 307) serving that third-stage
                    destination
5           END IF

DONE

FOR
10
                Each group of the parallel queue lists

DO

15              //  Now make all the necessary links in the parallel
                    queue lists for the cell stored in the shared single-copy
                    cell buffer The parallel queue lists are arranged in groups, one
20                  group per output (third) stage (ASX) device and each
                    group containing one linked list at each of the four
                    service priorities for each of the output ports of the
                    corresponding third stage ASX 25                  The operations of the following FOR loop are done
                    concurrently

IF

30                  Exactly one bit of the third-stage destination register
                    corresponding to this group is set

THEN

35                  Link a new entry to the queue list corresponding to that
                    bit

ELSE IF

40                  More than one bit of the third-stage destination register
                    corresponding to this group is set

THEN

45                  Select, according to the queue of routing field in the
                    local header, exactly one of the bits set for this group,
                    and link a new entry to that queue list.

END IF
50
            IF

If a new entry has been made within this group

55          THEN
```

30

> Increment the reference count of the stored cell by one
>
>> IF
>>
>>> The length of the queue list to which the cell has been linked exceeds the backpressure threshold
>>>
>>>> // In this instance, for the ASX Input Buffer Insertion application, the version of the dynamic thresholding scheme is characterized by the function
>>>>
>>>> $$T = \alpha\left(B - (numinputs \cdot latency) + 1 - \beta \sum queuelength\right)$$
>>>>
>>>> where $\alpha$, $\beta$, $B$ and $queuelength$ are as described under MACHINE: 2, ABM Ingress Buffer Insertion. The values numinputs and latencey are, respectively, the total number of inputs to the ASX, and the maximum time in cell transfer intervals for all congestion information to be transferred from the ASX to the backpressure control functions in the connected ABMs. So long as B is never set greater than the actual number of cell storage locations in the ASX, this provision insures that no cells will be lost even if all connected ABMs transfer cells between the time this threshold is crossed and the resultant backpressure indication is completed at the maximum latency.
>>>
>>> THEN
>>>
>>>> Set the backpressure bit at the corresponding queue and priority in the backpressure bitmap
>>>
>>> END IF
>>
>> END IF
>
> DONE
>
>> END IF
>
> DONE
>
> END MACHINE

MACHINE: 5. – First-Stage Switching (ASX) Output Buffer Unloading (304-308)

> // On output the first stage ASX must negotiate a set of connections through each of the center stage crossbar ABs. For this reference implementation we describe a concurrent bid and dispatch technique, but other techniques, such as a sequential search, are equally feasible, c.f. Fabio M. Chiussi, "Design, Performance and Implementation of a Three-Stage Banyan-Based Architecture with Input and Output Buffers for Large Fast Packet Switches," Dissertation, Stanford University, July 1993.

Either technique benefits from a "speedup" advantage between the end stage external input-output ports and the connections through the center stage crossbars. In the reference implementation this is achieved by having a larger number of connections toward the crossbars than toward the input-output ports, but the speedup could also be obtained by operating the center stage connections at a higher transfer rate than the external input-output ports.

Two important parameters of the following description are $N_{ports}$ the number of ports (303) from each first-stage ASX device toward the center stage crossbars (15nn), and $N_{max}$, the maximum number of entries from any one queue that can be transferred during a single parallel transfer cycle to the center stage crossbars.

FOR

All of the parallel queue lists (306 & 307) over their four priorities

DO

Form the priority independent "queue can be served" value:

IF

At least one cell is linked at any priority for this queue

THEN

The queue can be served value is *true*

ELSE

The queue can be served value is *false*

END IF

DONE

// The following is an illustrative randomization scheme for selecting the queue entries to be "bid" in a concurrent dispatch implementation. A double "round robin" list structure is assumed, along with a priority weighting as described above for the Ingress ABM Buffer Unloading unit, thus a "weighted round robin." Other strategies are obviously possible.

FOR

Each group of the parallel queue lists associated with a third stage module, begin at a (pseudo)-random position and continue circularly until this loop is broken

DO

Chiussi-Kneuer-Kum* 11-4

*At the next round robin position in this group (associated with an explicit output port of the third stage module)*

IF

*The queue can be served value is true*

THEN

*Include the cell from this queue, at the priority indicated by the implemented priority rule.*

END IF

IF

*There have now been $N_{ports}$ bids registered*

OR

*$N_{max}$ bids have been registered for all non-empty queues*

OR

*all queues are empty*

THEN

*BREAK the search loop*

END IF

DONE

// Now present the bids to the center stage crossbars.

The bids and responses may be communicated among the devices by any means. In the reference implementation we provide dedicate wire paths, but they could just as well be multiplexed into the main cell transfer paths anywhere such a path might be available.

FOR

*Each of the crossbars in order*

// *In the block diagram of FIG. 15 the number of AXBs is shown equal to the number of first stage ports to the center (15nn), but it is also possible to have a multiplicity of ports from each first-stage ASX to each AXB.*

DO

FOR

*Each selected bid in turn*

33

Chiussi-Kneuer-Kumar 11-4

```
        DO

Present the bid to the next successive crossbar

The crossbar will respond to each bid with one of the following
            values:

granted blocked by output contention blocked by backpressure from the third stage destination
                    queue
        DONE

FOR

Each granted bid

DO

IF

Within this bid set, any earlier bid from the same queue was
                blocked by output contention

THEN

Replace this entry with the earliest such bid not already already
                covered by an earlier replacement // Note that since the replacement is to the same destination,
                the path is guaranteed to be clear. Also note that a value
                N_max = 2 guarantees that no earlier replacement can have
                occurred.

END IF
        DONE

DONE

FOR

For each remaining bid

DO

Send the cell associated with the queue entry to th center stage crossbar and
            decrement the reference count of the cell storage location

IF
```

```
                    The reference count is now 0

THEN

5                  Return the cell storage location to the free pool (306-307)

END IF

Unlink the queue entry from its list, and decrement the occupancy count for that list
10
               IF The length of that queue list is now below the backpressure threshold

15             THEN

Clear the backpressure bit at the corresponding queue and priority in the
                    backpressure bitmap (to be sent to all the port units that input to this
                    ASX)
20
               END IF

DONE

25   END MACHINE

//   The crossbar switching device (AXB) of FIG. 4 is much simpler than the ASX
          and is represented as a single machine.

30   MACHINE:  6. – Center-Stage Crossbar Switching (AXB)

//  The following operations are done in every bidding   cycle.   In   the
              reference implementation they are done in parallel (404 and 405).

35        FOR

Each input port (401), cyclically from a "random" starting point and in
               "random" order from that point

40        DO

IF

A bid is present at this input
45
               THEN

IF

50                       The indicated output port (402) hasn't been taken by an earlier bid
                         of the current cycle

THEN

55                       Pass this bid to the third-stage ASX
```

Chiussi-Kneuer-Kumar -4

*Return the response from the third-stage ASX, either granted or blocked by backpressure from the third stage destination queue*

ELSE

*Return blocked by output contention*

END IF

END IF

DONE

// *The first stage ASXs are "trusted" to respond correctly to the bid-reply exchange described above.*

*Pass the cells presented by the first stage ASXs*

END MACHINE

MACHINE: 7. – Third-Stage Switching (ASX) Input Buffer Insertion (304-308)

// *This device is identical to the ASX device in the first stage of the fabric, and we describe only application specific differences in reference to the description of the first stage devices above.*

FOR

*Each Input Port (302)*

DO

IF

*A cell is present from this input port*

THEN

*First store the cell in any free location in the shared single-copy cell buffer (304)*

*Mark the reference count for the stored cell to be 0*

FOR

*Each output destination*

DO

*Initially clear its bit in the third-stage destination register*

DONE

FOR

Chiussi-Kneuer-Kumar 11-4

*Each bit of the output port bitmap*

DO

IF

*That bit is on*

THEN

*Set the bit of the third-stage destination register corresponding to the parallel queue group (306 and 307) for the associated output module (In the third-stage switching ASX only one multicast bit will map into each parallel queue group)*

END IF

DONE

// *Now make all the necessary links in the parallel queue lists for the cell stored in the shared single-copy cell buffer.*

Application change: *in the parallel queue lists each "group" is associated with the fabric output port that is identically one of the physical output ports of this ASX. Thus each "group" has onl one member, corresponding to that physical port, but multiple concurrent linkings may still occur because o multicast to several of those ports.*

FOR

*Each group of the parallel queue lists*

DO

IF

*The one bit of the third-stage destination register corresponding to this group is set*

THEN

*Link a new entry to the queue list corresponding to that bit, at the priority indicated in the local header of the cell*

END IF

IF

*If a new entry has been made within this group*

THEN

*Point the new entry to the stored cell, and increment the reference count of the cell by one*

37

Chiussi-Kneuer-Kumar -4

IF

*The length of the queue list exceeds the backpressure threshold*

THEN

*Set the backpressure bit at the corresponding queue and priority backpressure bitmap (308) (to be used in response to bids from the center-stage AXB)*

END IF

END IF

DONE

END IF

DONE

END MACHINE

MACHINE: 8. – Third-Stage Switching (ASX) Output Buffer Unloading (304-308)

// *APPLICATION CHANGE:* *No bidding is necessary for the physical outputs of the ASX that are direct outputs of the switching fabric.*

*However, the flow from each physical output is subject to egress backpressure from the output port unit, as indicated below.*

FOR

*Each physical output port*

DO

*Set the value of data can be sent for this port to false*

FOR

*Each service priority*

DO

IF

*Data is present for this port at this priority*

*AND*

*Global backpressure is not asserted at this priority by the output port ABM attached to this port*

THEN

Chiussi-Kneuer-Kum... -11-4

*Set the value of data can be sent for this port to true*

END IF

DONE

IF

*Data can be sent for this port*

THEN

*Select the cell from this queue, at the priority indicated by the implemented priority rule.*

*Decrement the reference count of the associated cell storage location*

END IF

IF

*The reference count is now 0*

THEN

*Return the cell storage location to the free pool*

END IF

*Unlink the queue entry from the queue list, and decrement its occupancy count*

IF

*The length of the queue list to which the cell has been unlinked is now below the backpressure threshold*

THEN

*Clear the backpressure bit at the corresponding queue and priority in the backpressure bitmap (to be used in response to bids from the center-stage AXB)*

END IF

DONE

END MACHINE

MACHINE: 9. – ABM Egress Buffer Insertion (208)

// *The following description of a reference implementation is complete and workable. However, the real implementation is somewhat more complex to achieve a desired increase in memory and processing efficiency.*

Chiussi-Kneuer-Kumar 11-4

*The operations described occur once per cell period of the main input from the switching fabric.*

IF

*A cell is present on the input from the switching fabric*

THEN

// *"Staging" a cell for possible multicast enqueing.*

*Store the cell in a free location of the output buffer RAM (10nn) with a reference count (1055) of 0*

// *The cell is stored first even though it may later be rejected (see below).*

*Using the connection tag (522) contained in the local header of the cell, obtain the local subport output bitmap (1053) from the control (1010)*

*Queue a pointer to the stored cell (1004), the subport output bitmap (1054), and a multicast address offset value of 0 on a temporary multicast staging queue*

END IF

// *Unstaging the multicast cells (possibly of degree 1, i.e. unicast) and linking them to the subport service queues.*

FOR

*Two repetitions per cell period*

// *This 2:1 speed advantage keeps the occupancy of the temporary multicast staging queue minimized.*

DO

IF

*There is an entry at the head of the multicast staging queue*

THEN

*Set the output port number equal to the place value of the leftmost bit of the subport output bitmap*

IF

*The output queue list for output port number at the priority indicated in the local header of the cell does not exceed its congestion threshold*

THEN

*Increment the reference count of the cell storage location (1055)*

40

Chiussi-Kneuer-Kum?- 11-4

*Make a new entry on the indicated priority list of the output port number, with a pointer to the cell storage location (1051) and with the current value of the multicast address offset (1052), also referred to as egress header translation offset*

IF

*The total queue occupancy at the priority indicated in the local header of the cell does exceed the egress backpressure global congestion threshold*

THEN

// This is the case in which egress backpressure can be applied globally to the third stage ASX.

*Signal egress backpressure at the priority of the cell to the third-stage ASX serving this output port unit*

END IF

END IF

*Increment the multicast address offset by 1*

*Clear the leftmost bit of the subport output bitmap*

IF

*All bits of the subport output bitmap are now cleared*

// Multicast staging for this cell is completed.

THEN

*Unlink the completed entry from the multicast staging queue*

IF

*The reference count for the cell storage location is zero*

// The cell was rejected for congestion at all of its destinations.

THEN

*Return the cell storage location to the free pool (1004)*

END IF

END IF

END IF

DONE

Chiussi-Kneuer-Kum    11-4

END MACHINE

MACHINE: 10. – ABM Egress Buffer Unloading (207)

// In the reference implementation we provide
rate control of the buffer unloading to the
various output subports (212), proportional
to their link rates. This permits a very
straightforward implementation outlined
below, but it is not essential to the concept
of the invention.

FOR

Each output subport, in a round robin sequence (possibly proportional to the subport rate)

DO

IF

A cell is present at any priority for that subport (1051)

THEN

Select the cell to serve from this queue, at the priority indicated by the implemented priority rule.

Unlink the cell storage pointer (1051) from the selected subport output queue list Decrement the reference count (1055) of the cell storage location by 1

IF

The reference count is now 0

THEN

IF

The total queue occupancy at the priority indicated in the local header of the cell does not exceed the egress backpressure global congestion threshold

THEN

Signal release of egress backpressure at the priority of the cell to the third-stage ASX serving this output port unit

END IF

Return the cell storage location to the free pool (1004)

END IF

Chiussi-Kneuer-Kum- - 11-4

*Increment the priority weighting sequence position for this subport*

*// Because of possibly different rates per subport, the priority weighting sequences are incremented independently per supbort.*

END IF

DONE

END MACHINE

MACHINE: 11. – ALM Egress (206)

IF

*A cell is available from the ABM*

THEN

*Use the connection tag (522) contained from the local header of the cell (542) and the multicast address offset (1052) from the output queue list entry to reference (700) the output VC table (600) for this cell and destination*

*Provide the VC translation for output (601), strip the local header and deliver the cell to the output subport (212).*

END IF

END MACHINE

We claim:

1. Apparatus for multicasting an ingress cell received at one of a plurality of input ports of a multistage switch network to one or more of a plurality of output ports of the network, each stage of the multistage switch network including one or more switching elements, the apparatus comprising at least one switching element of at least one stage of the multistage switch network including:
   (a) means for receiving the ingress cell including a data payload and an output port bitmap segment identifying the one or more output ports of the multistage switch network to which the data payload is to be outputted,
   (b) means for storing the data payload in an available cell buffer,
   (c) a plurality of linked list output queues, at least one for each of the multistage switch network output ports for storing a cell buffer address entry,
   (d) a reference counter, associated with each cell buffer, for storing a number equal to the number of associated one or more subsequent stage switching elements to which that ingress cell is to be outputted,
   (e) means for interpreting the bitmap segment to identify multistage switch network output ports and any one or more subsequent stage switching elements to which the data payload is to be delivered and for making an entry into one or more linked list output queues associated with these subsequent stage switching elements, exactly one entry for each subsequent stage switching element to which that ingress cell should be outputted,
   (f) means for transmitting, to each of the identified one or more subsequent stage switching elements or multistage switch network output ports, one copy of the data payload according to a sequence determined by the entries in the corresponding linked list output queue, and
   (g) means for deleting, at each of the linked list output queues, an entry therefrom when the payload is outputted to each identified one or more subsequent stage switching elements or multistage switch network output port and decrementing the reference counter by one, and for making available the cell buffer when the reference counter equals zero.

2. The apparatus of claim 1 wherein the cell buffer and the linked list output queue are located in the same memory.

3. The apparatus of claim 1 wherein the linked list output queues of each of the multistage switch network output ports are located in the same memory.

4. The apparatus of claim 1 wherein a separate memory is dedicated to each multistage switch network output port and wherein entries into the linked list output queues are done concurrently.

5. The apparatus of claim 1 wherein the bitmap segment is put into a separate queue and the entries are made at a rate that is equal to or faster than an ingress cell receive rate.

6. The apparatus of claim 1 wherein entries into the linked list output queues occur at a rate equal to the ingress cell receive rate multiplied by the number of one or more subsequent stage switching elements.

7. The apparatus of claim 1 wherein at least one output port includes a plurality of singly linked list output queues and wherein the processing of each of the singly linked list output queues for said at least one multistage switch network output port is independent.

8. The apparatus of claim 1 wherein the processing is based on priority as determined by header data included in the ingress cell.

9. The apparatus of claim 1 further including a separate linked list output queue for a received unicast ingress cell and a separate linked list output queue for a received multicast ingress cell.

10. The apparatus of claim 1 wherein, when more than one linked list output queues are used for a multistage switch network output port, the more than one linked list output queues are implemented as a single linked list output queue having one or more additional bits indicating from which of the more than one linked list output queues the next cell should be processed.

11. Switch element for use in a multistage switch network for multicasting an ingress cell received at an input port to one or more of a plurality of output ports of the multistage switch network, the switch element comprising:
   switch element input port for receiving the ingress cell including a data payload and an output port bitmap segment identifying the one or more output ports of the multistage switch network to which the data payload is to be outputted;
   processing apparatus for processing the ingress cell by:
      (a) storing a data payload in an available cell buffer,
      (b) establishing a plurality of linked list output queues, at least one for each of the multistage switch network output ports,
      (c) associating with each cell buffer a reference counter for storing a number equal to the number of associated one or more subsequent stage switching elements to which that ingress cell is to be outputted,
      (d) interpreting the bitmap segment to identify multistage switch network output ports and any associated one or more subsequent stage switching elements of other stages of the multistage switch network to which the data payload is to be delivered,
      (e) making an entry into an associated linked list output queue, exactly one entry for each subsequent stage switching element to which that ingress cell should be outputted,
      (f) transmitting, to each switch element port associated with the identified multistage switch network output ports and any associated one or more subsequent stage switching elements, one copy of the data payload according to a sequence determined by the entries in the corresponding linked list output queue,
      (g) deleting, at each of the linked list output queues, an entry therefrom when the payload is outputted to an identified multistage switch network output port and any associated one or more subsequent stage switching elements and decrementing the reference counter by one, and
      (h) making available the cell buffer when the reference counter equals zero; and
   switch element output ports for outputting the payload received from the processing apparatus.

12. A method of multicasting an ingress cell received at one of a plurality of input ports of a multistage switch network to one or more of a plurality of output ports, the method comprising the steps of
   (a) receiving the ingress cell including a data payload and an output port bitmap segment identifying the one or more output ports of the multistage switch network to which the data payload is to be outputted,
   (b) storing the data payload in an available cell buffer,
   (c) establishing a plurality of linked list output queues, at least one for each of the multistage switch network output ports, (d) associating with each cell buffer a reference counter for storing a number equal to the number of multistage switch network ports or associated one or more subsequent stage switching elements to which that ingress cell is to be outputted, (e) interpreting the bitmap segment to identify multistage switch network output ports to which the data payload is to be delivered, (f) making an entry into the associated linked list output queue associated with these subsequent stage switching elements, exactly one entry for each subsequent stage switching element to which that ingress cell should be outputted, (g) transmitting, to each of the identified one or more subsequent stage switching elements or multistage switch network output ports, one copy of the data payload according to a sequence determined by the entries in the corresponding linked list output queue, (h) deleting, at each of the linked list output queues, an entry therefrom when the payload is outputted to an identified one or more subsequent stage switching elements or multistage switch network output port and decrementing the reference counter by one, and (i) making available the cell buffer when the reference counter equals zero.

13. The apparatus of claim 12 wherein the cell buffer and the linked list output queue are located in the same memory.

14. The apparatus of claim 12 wherein the linked list output queues of each of the multistage switch network output ports are located in the same memory.

15. The apparatus of claim 12 wherein a separate memory is dedicated to each multistage switch network output port and wherein entries into the linked list output queues are done concurrently.

16. The apparatus of claim 12 wherein the bitmap segment is put into a separate queue and the entries are made at a rate that is equal to or faster than an ingress cell receive rate.

17. The apparatus of claim 12 wherein entries into the linked list output queues occur at a rate equal to the ingress cell receive rate multiplied by the number of subsequent stage switching elements.

18. The apparatus of claim 12 wherein at least one output port includes a plurality of singly linked list output queues and wherein the processing of each of the singly linked list output queues for said at least one output port is independent.

19. The apparatus of claim 18 wherein the processing is based on priority as determined by header data included in the ingress cell.

20. The apparatus of claim 12 further including a separate linked list output queue for a received unicast ingress cell and a separate linked list output queue for a received multicast ingress cell.

* * * * *